United States Patent
Schaffner et al.

[19]

[11] Patent Number: 6,129,165
[45] Date of Patent: Oct. 10, 2000

[54] CURB-CLIMBING POWER WHEELCHAIR

[75] Inventors: Walter E. Schaffner, Shavertown;
James P. Mulhern, Hunlock Creek;
Stephen J. Antonishak, Alden; Gerald J. White, Hunlock Creek, all of Pa.

[73] Assignee: Pride Mobility Products, Corporation, Exeter, Pa.

[21] Appl. No.: 09/060,187

[22] Filed: Apr. 14, 1998

Related U.S. Application Data

[63] Continuation-in-part of application No. 29/056,607, Jul. 3, 1996, Pat. No. Des. 397,645, and a continuation-in-part of application No. 08/742,972, Nov. 1, 1996, and a continuation-in-part of application No. 08/748,214, Nov. 12, 1996, Pat. No. 5,944,131, and a continuation-in-part of application No. 29/067,721, Jan. 31, 1997, Pat. No. Des. 404,693.

[60] Provisional application No. 60/041,973, Apr. 15, 1997.

[51] Int. Cl.[7] ................................................. B60K 1/00
[52] U.S. Cl. ....................... 180/65.1; 180/907; 180/250.1
[58] Field of Search .................................. 180/65.1, 907, 180/6.5, 6.48, 250.1; 297/423.26, 423.34, 423.36, DIG. 4, DIG. 10

[56] References Cited

U.S. PATENT DOCUMENTS

| | | |
|---|---|---|
| Re. 30,867 | 2/1982 | Gaffney . |
| D. 171,318 | 1/1954 | Wegele . |
| D. 178,841 | 9/1956 | Krummer . |
| D. 305,521 | 1/1990 | Wiatrak et al. . |
| D. 357,653 | 4/1995 | Kruse . |
| D. 365,786 | 1/1996 | Peterson . |
| D. 365,787 | 1/1996 | Peterson et al. . |
| D. 365,788 | 1/1996 | Peterson . |
| D. 380,991 | 7/1997 | Deming . |
| 1,046,681 | 10/1912 | Towson . |

(List continued on next page.)

FOREIGN PATENT DOCUMENTS

| | | |
|---|---|---|
| 1018906 | 10/1977 | Canada . |
| 1207867 | 7/1986 | Canada . |
| 1233100 | 2/1988 | Canada . |
| 338689 | 10/1989 | European Pat. Off. . |
| 0 339 500 B1 | 3/1993 | European Pat. Off. . |

(List continued on next page.)

OTHER PUBLICATIONS

Pride Health Care, Inc. brochure entitled "The Pride . . . Partner . . . Your Mobility Connection" (undated).
Everest & Jennings brochure entitled "Quest Transportable Power Wheelchair", Oct., 1994.
Huntleigh Mobility brochure entitled "Corbie Power Chair The Ultimate in Manoeuvability and Style", 1996.
Pride Health Care, Inc. brochure entitled "Pride's New Jazzy" (undated).
Sunrise Medical Ltd. brochure entitled "PowerTec F60 & F60S", 1994.
Everest and Jennings O.C. 3 brochure entitled "Voyager IV", 1983.
Permobil brochure entitled "Permobil Power Chairman Enpowering the Human Spirit" (undated).
Bodypoint Designs brochure entitled "Bodypoint Designs Winter Catalog 1995–1996", Copyright 1995.
Orthofab Inc. brochure entitled "V.I.P. Mobility for Everyone" (undated).
Permobile brochure entitled "Permobil for Kids" (undated).

(List continued on next page.)

*Primary Examiner*—Richard M. Camby
*Attorney, Agent, or Firm*—Seidel, Gonda, Lavorgna & Monaco, PC

[57] ABSTRACT

A curb-climbing front wheel drive power wheelchair has a frame, a seat connected to the frame, a pair of drive wheels connected to the frame and rotatable about a transverse axis below a portion of the seat supporting the wheelchair occupant's thighs. The power wheelchair also has at least one ground-engaging idler wheel connected to the frame behind the drive wheels and anti-tip wheels forward of the drive wheels, rigidly connected to the motors for pivotal movement.

32 Claims, 24 Drawing Sheets

U.S. PATENT DOCUMENTS

| | | |
|---|---|---|
| 1,268,229 | 6/1918 | Frank . |
| 1,281,980 | 10/1918 | Kostewich . |
| 1,293,958 | 2/1919 | Smedshammer . |
| 1,296,531 | 3/1919 | Landby . |
| 1,309,305 | 7/1919 | Scheiner . |
| 1,333,121 | 3/1920 | Roche . |
| 1,348,568 | 8/1920 | Kemble . |
| 1,428,907 | 9/1922 | Reigh . |
| 1,459,371 | 6/1923 | Kelly . |
| 1,875,512 | 9/1932 | Silvestri . |
| 1,984,831 | 12/1934 | Higley . |
| 2,448,992 | 9/1948 | Love et al. . |
| 2,495,573 | 1/1950 | Duke . |
| 2,574,199 | 11/1951 | Tandler et al. . |
| 2,594,034 | 4/1952 | King . |
| 2,696,272 | 12/1954 | Schlaphoff . |
| 2,749,997 | 6/1956 | Deslippe . |
| 2,817,406 | 12/1957 | Brewer . |
| 2,819,093 | 1/1958 | Geiser . |
| 2,839,146 | 6/1958 | Bouffort . |
| 2,867,449 | 1/1959 | Shawver . |
| 2,886,118 | 5/1959 | Strunk . |
| 2,910,130 | 10/1959 | Schlaphoff . |
| 2,919,758 | 1/1960 | Newton et al. . |
| 2,973,048 | 2/1961 | Jensen . |
| 2,978,251 | 4/1961 | Gerdes . |
| 2,986,200 | 5/1961 | Nobile . |
| 2,993,550 | 7/1961 | Klappert . |
| 2,994,546 | 8/1961 | Cooper . |
| 3,001,599 | 9/1961 | Fryar . |
| 3,004,619 | 10/1961 | Straussler . |
| 3,042,132 | 7/1962 | Bouffort . |
| 3,043,389 | 7/1962 | Steinberg . |
| 3,057,425 | 10/1962 | Proett . |
| 3,079,172 | 2/1963 | Burwell . |
| 3,104,112 | 9/1963 | Crail . |
| 3,106,481 | 10/1963 | Sorg . |
| 3,110,352 | 11/1963 | McClarnon . |
| 3,117,648 | 1/1964 | Landreth . |
| 3,177,962 | 4/1965 | Bailey . |
| 3,190,676 | 6/1965 | Junge . |
| 3,191,990 | 6/1965 | Rugg et al. . |
| 3,202,234 | 8/1965 | Osborne . |
| 3,212,596 | 10/1965 | Johnson . |
| 3,213,957 | 10/1965 | Wrigley . |
| 3,249,171 | 5/1966 | Klinghorn . |
| 3,254,734 | 6/1966 | Behrmann . |
| 3,282,365 | 11/1966 | McReynolds . |
| 3,329,228 | 7/1967 | Harris . |
| 3,369,629 | 2/1968 | Weiss . |
| 3,486,765 | 12/1969 | Turner . |
| 3,504,934 | 4/1970 | Wallis . |
| 3,513,926 | 5/1970 | Paget, Jr. . |
| 3,580,349 | 5/1971 | Brennan et al. . |
| 3,580,591 | 5/1971 | Coffey . |
| 3,605,929 | 9/1971 | Rolland . |
| 3,664,450 | 5/1972 | Udden et al. . |
| 3,698,502 | 10/1972 | Patin . |
| 3,713,502 | 1/1973 | DeLaney et al. . |
| 3,749,192 | 7/1973 | Karchak, Jr. et al. . |
| 3,770,289 | 11/1973 | Dougherty et al. . |
| 3,781,031 | 12/1973 | Patin . |
| 3,855,654 | 12/1974 | Pivacek . |
| 3,871,464 | 3/1975 | Eden . |
| 3,876,041 | 4/1975 | Pivacek . |
| 3,891,229 | 6/1975 | Gaffney . |
| 3,896,891 | 7/1975 | Miltenburg et al. . |
| 3,901,527 | 8/1975 | Danziger et al. . |
| 3,902,758 | 9/1975 | Pivacek . |
| 3,917,312 | 11/1975 | Rodaway . |
| 3,921,744 | 11/1975 | Benoit et al. . |
| 3,924,706 | 12/1975 | Figura . |
| 3,930,551 | 1/1976 | Cragg . |
| 3,931,989 | 1/1976 | Nagamitsu . |
| 3,933,373 | 1/1976 | Gammelgaard . |
| 3,941,198 | 3/1976 | Kappas . |
| 3,945,449 | 3/1976 | Ostrow . |
| 3,952,822 | 4/1976 | Udden et al. . |
| 3,953,054 | 4/1976 | Udden et al. . |
| 4,006,916 | 2/1977 | Patin . |
| 4,037,678 | 7/1977 | Braune . |
| 4,042,054 | 8/1977 | Ward . |
| 4,082,348 | 4/1978 | Haury . |
| 4,108,449 | 8/1978 | Rhodes . |
| 4,111,274 | 9/1978 | King et al. . |
| 4,119,163 | 10/1978 | Ball . |
| 4,203,612 | 5/1980 | Feikema . |
| 4,319,381 | 3/1982 | Rodaway . |
| 4,353,567 | 10/1982 | Weldy . |
| 4,387,325 | 6/1983 | Klimo . |
| 4,424,873 | 1/1984 | Terlaak . |
| 4,429,055 | 1/1984 | Rao . |
| 4,431,076 | 2/1984 | Simpson . |
| 4,436,320 | 3/1984 | Brudermann et al. . |
| 4,449,990 | 5/1984 | Tedford, Jr. . |
| 4,452,327 | 6/1984 | Mowat et al. . |
| 4,460,057 | 7/1984 | Kohyama . |
| 4,469,188 | 9/1984 | Mita . |
| 4,500,102 | 2/1985 | Haury et al. . |
| 4,503,925 | 3/1985 | Palmer et al. . |
| 4,511,825 | 4/1985 | Klimo . |
| 4,513,832 | 4/1985 | Engman . |
| 4,538,857 | 9/1985 | Engman . |
| 4,541,501 | 9/1985 | Kawasaki . |
| 4,546,764 | 10/1985 | Gerber . |
| 4,555,121 | 11/1985 | Lockard et al. . |
| 4,570,739 | 2/1986 | Kramer . |
| 4,595,212 | 6/1986 | Haury et al. . |
| 4,633,962 | 1/1987 | Cox et al. . |
| 4,634,941 | 1/1987 | Klimo . |
| 4,671,257 | 6/1987 | Kaiser et al. . |
| 4,721,321 | 1/1988 | Haury et al. . |
| 4,724,559 | 2/1988 | Bly et al. . |
| 4,771,840 | 9/1988 | Keller . |
| 4,798,255 | 1/1989 | Wu . |
| 4,805,925 | 2/1989 | Haury et al. . |
| 4,811,945 | 3/1989 | Disbrow et al. . |
| 4,813,693 | 3/1989 | Lockard et al. . |
| 4,834,413 | 5/1989 | Patel et al. . |
| 4,840,390 | 6/1989 | Lockard et al. . |
| 4,887,830 | 12/1989 | Fought et al. . |
| 4,892,166 | 1/1990 | Gaffney . |
| 4,909,525 | 3/1990 | Flowers . |
| 4,947,955 | 8/1990 | Hopely, Jr. . |
| 4,962,551 | 10/1990 | Bly . |
| 4,967,864 | 11/1990 | Boyer et al. . |
| 4,981,305 | 1/1991 | Lockard et al. . |
| 4,989,890 | 2/1991 | Lockard et al. . |
| 5,020,624 | 6/1991 | Nesterick et al. . |
| 5,033,793 | 7/1991 | Quintile . |
| 5,038,430 | 8/1991 | Bly . |
| 5,074,372 | 12/1991 | Schepis . |
| 5,078,227 | 1/1992 | Becker . |
| 5,094,310 | 3/1992 | Richey et al. . |
| 5,111,899 | 5/1992 | Reimann . |
| 5,121,806 | 6/1992 | Johnson . |
| 5,121,938 | 6/1992 | Gross et al. . |
| 5,134,731 | 8/1992 | Quintile et al. . |
| 5,145,020 | 9/1992 | Quintile et al. . |
| 5,150,762 | 9/1992 | Stegeman et al. . |
| 5,154,251 | 10/1992 | Fought . |
| 5,156,226 | 10/1992 | Boyer et al. . |

| | | |
|---|---|---|
| 5,169,506 | 12/1992 | Michaels . |
| 5,170,826 | 12/1992 | Carstensen et al. . |
| 5,180,025 | 1/1993 | Yeh et al. . |
| 5,183,133 | 2/1993 | Roy et al. . |
| 5,186,793 | 2/1993 | Michaels . |
| 5,195,803 | 3/1993 | Quintile . |
| 5,203,610 | 4/1993 | Miller . |
| 5,228,533 | 7/1993 | Mitchell . |
| 5,238,082 | 8/1993 | Stegeman et al. . |
| 5,263,728 | 11/1993 | Patel et al. . |
| 5,294,141 | 3/1994 | Mentessi et al. . |
| 5,341,517 | 8/1994 | Bly . |
| 5,366,037 | 11/1994 | Richey . |
| 5,366,038 | 11/1994 | Hidetsugu et al. . |
| 5,378,045 | 1/1995 | Siekman et al. . |
| 5,397,443 | 3/1995 | Michaels . |
| 5,413,187 | 5/1995 | Kruse et al. . |
| 5,421,598 | 6/1995 | Robertson et al. . |
| 5,435,404 | 7/1995 | Garin, III . |
| 5,442,823 | 8/1995 | Siekman et al. . |
| 5,445,233 | 8/1995 | Fernie et al. . |
| 5,513,899 | 5/1996 | Michaels et al. . |
| 5,518,081 | 5/1996 | Thibodeau . |
| 5,522,734 | 6/1996 | Goertzen . |
| 5,531,284 | 7/1996 | Okamoto . |
| 5,540,297 | 7/1996 | Meier . |
| 5,573,260 | 11/1996 | Peterson et al. . |
| 5,575,348 | 11/1996 | Goertzen et al. . |
| 5,592,997 | 1/1997 | Ball . |
| 5,690,185 | 11/1997 | Sengel . |
| 5,697,465 | 12/1997 | Kruse . |
| 5,727,802 | 3/1998 | Garven et al. . |
| 5,848,658 | 12/1998 | Pulver et al. . |
| 5,853,059 | 12/1998 | Goertzen et al. . |
| 5,899,475 | 5/1999 | Verhaeg . |

FOREIGN PATENT DOCUMENTS

| | | |
|---|---|---|
| 1064076 | 5/1954 | France . |
| 2215054 | 8/1974 | France . |
| 2383822 | 10/1978 | France . |
| 2399822 | 3/1979 | France . |
| 2703-727 | 8/1978 | Germany . |
| 2703727 | 8/1978 | Germany . |
| 2724553 | 12/1978 | Germany . |
| 3128112 | 2/1983 | Germany . |
| 92038786 | 6/1992 | Germany . |
| 296 14 531 U1 | 11/1996 | Germany . |
| 58-63575 | 4/1983 | Japan . |
| 1447961 | 9/1976 | United Kingdom . |
| 2061197 | 5/1981 | United Kingdom . |
| 2127364 | 4/1984 | United Kingdom . |
| 2132954 | 7/1984 | United Kingdom . |
| 2 192595 | 1/1988 | United Kingdom . |
| 2265868 | 10/1993 | United Kingdom . |
| 2265868A | 10/1993 | United Kingdom . |
| 2311970 | 10/1997 | United Kingdom . |
| WO8702633 | 5/1987 | WIPO . |
| WO8706205 | 10/1987 | WIPO . |
| WO 90/05515 | 5/1990 | WIPO . |
| WO9006097 | 6/1990 | WIPO . |
| WO9117077 | 11/1991 | WIPO . |
| WO 96/15000 | 5/1996 | WIPO . |
| WO9615752 | 5/1996 | WIPO . |

OTHER PUBLICATIONS

Quickie Designs Inc. brochure entitled "Quickie Power Products" (undated).

Ligtvoet Products B.V. brochure entitled "Ligtvoet Modern Design" (undated).

MEYRA Wilhelm Meyer GmbH & Co. KG brochure entitled "Vorbild Einer Neuen Zeit—MEYRA" (undated).

MEYRA Wilhelm Meyer GmbH & Co. KG brochure entitled "Die Elektrischen Aktiven—MEYRA" (undated).

MEYRA Wilhelm Meyer GmbH & Co. KG brochure entitled "Sonderbedieneinheiten—MEYRA" (undated).

Booster Electric Vehicles Ltd. brochure entitled "PUMA Booster" (undated).

Invacare brochure entitled "Cruiser 4E" (undated).

Mangar International brochure entitled "The Mangar Freestyle" (undated).

Aldersley Battery Chairs Limited brochure entitled "Aldersley EXCEL—The first of its kind!" (undated).

Aldersley Battery Chairs Limited brochure entitled "Are You Looking for a New Electric Wheelchair?" (undated).

Colours 'N motion brochure entitled "Little Dipper" (undated).

Colours by Permobil brochure entitled "Boing!" (undated).

Colours 'N motion brochure entitled "Eclipse" (undated).

Colours 'N motion brochure entitled "Impact" (undated).

Colours by Permobil order form for The Avenger (undated).

Colour by Permobil order form for the The Boing! (undated).

Colours by Permobil order form for The Supernova Xtreme (undated).

Colours by Permobil order form for The Eclipse (undated).

Colours by Permobil order form for The G–Force (undated).

Colours by Permobil order form The Impact (undated).

Colours by Permobil order form for The Little Dipper (undated).

LaBac Systems brochure entitled "LaBac Introduces it's Tilt, ASB, and RSR on the Quickie P300 with 20" Wheels" dated Jun. 3, 1996.

Kid–Kart order form dated Oct. 1, 1996.

Hoveround Corporation brochure entitled "Personal Mobility Vehicles" (undated).

Permobil brochure entitled "Chairman MPS Permobil Multi Position System" (undated).

Permobil order form for Chair.Man Mini Flex, Mar. 1, 1996.

Permobil order form for Chair.Man Stander, Mar. 1, 1996.

Permobil order form for Chair.Man MPS, Mar. 1, 1996.

Permobil order form or Chair.Man Corpus, Mar. 1, 1996.

Permobil order form for Chair.Man Robo, Mar. 1, 1996.

Permobil order form for Chair.Man Mini Stander, Mar. 1, 1996.

Permobil announcement entitled "Thank You for Your Interest in Permobil's Power Mobility Products!" (undated).

Booster Electric Vehicles Ltd. brochure entitled "BEATLE 2 Booster" (undated).

Permobil brochure entitled "Chairman of Permobil" (undated).

MEYRA Wilhelm Meyer GmbH & Co. KG brochure entitled "Elektronik OPTIMUS Light" (undated).

Invacare brochure entitled "Action P73," 1997.

Quickie Designs Inc. brochure entitled "Quickie P100/P110" (undated).

"Designer's Corner" article, *Design News* magazine, p. 54, Feb. 24, 1992.

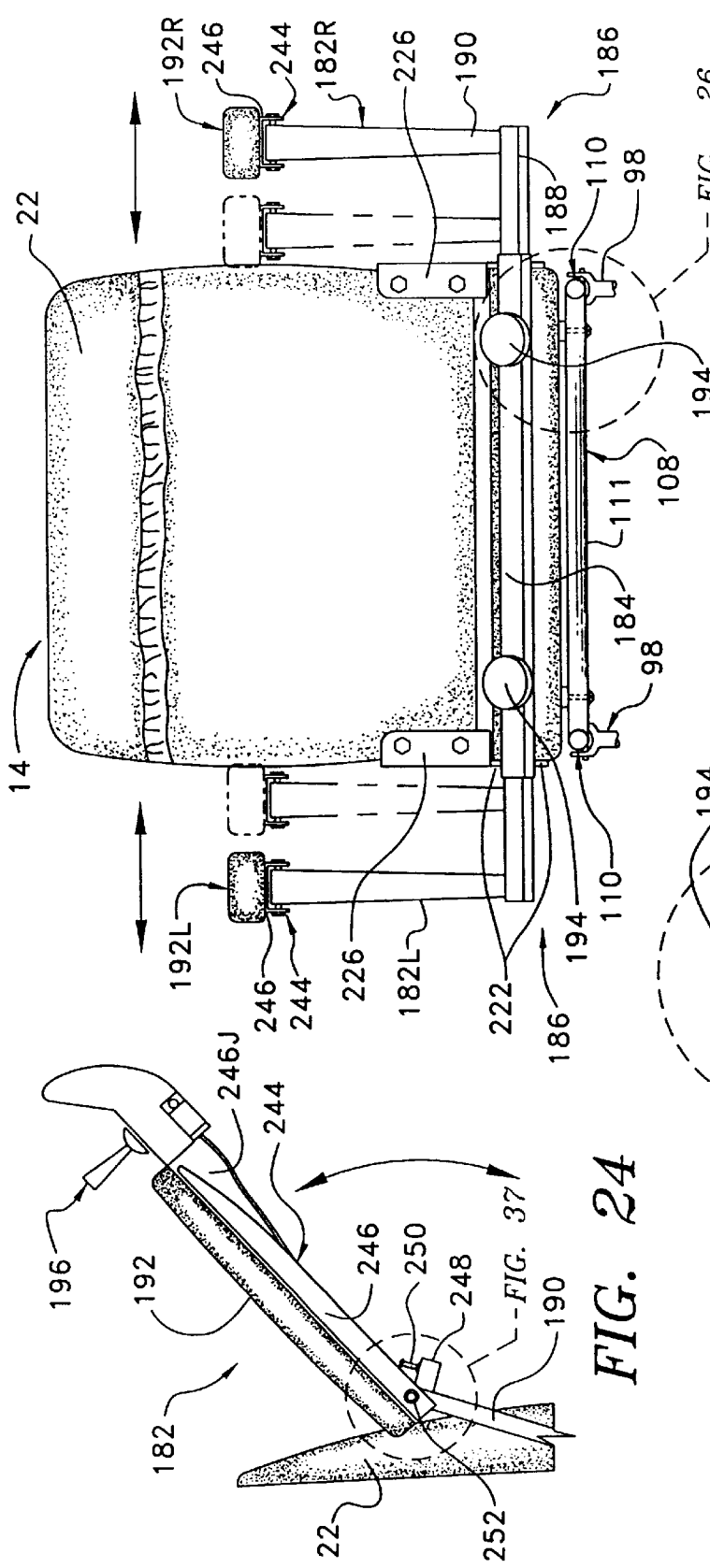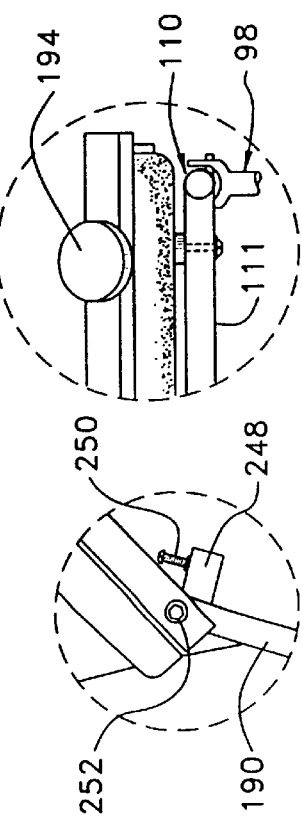

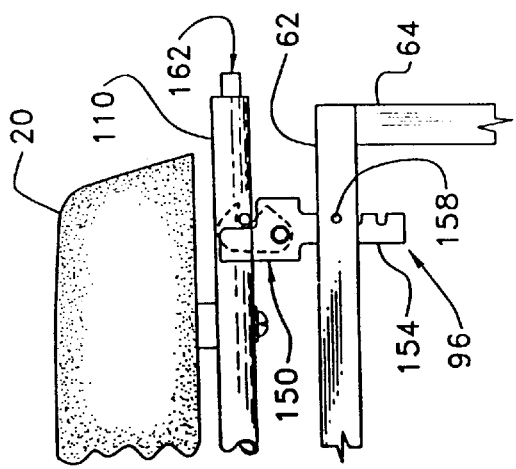
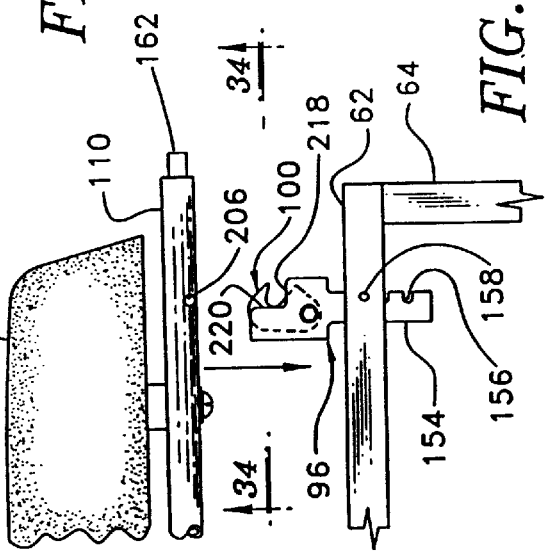
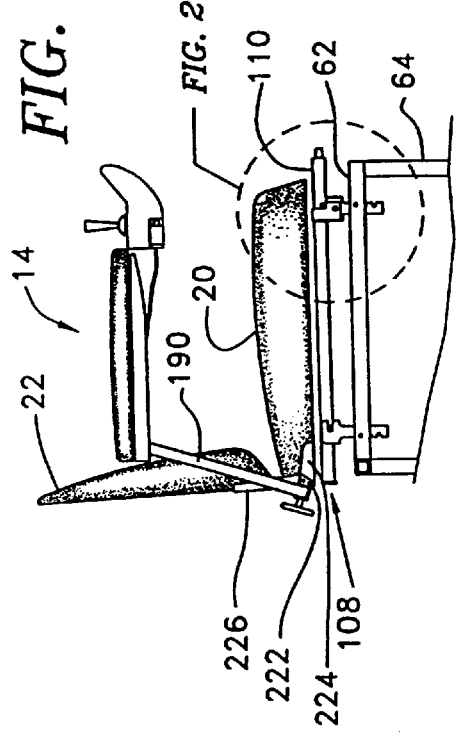
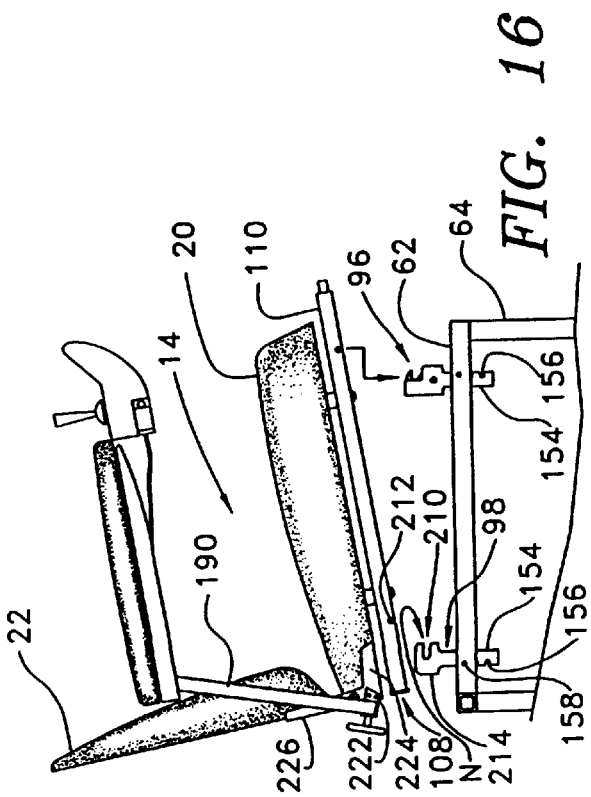

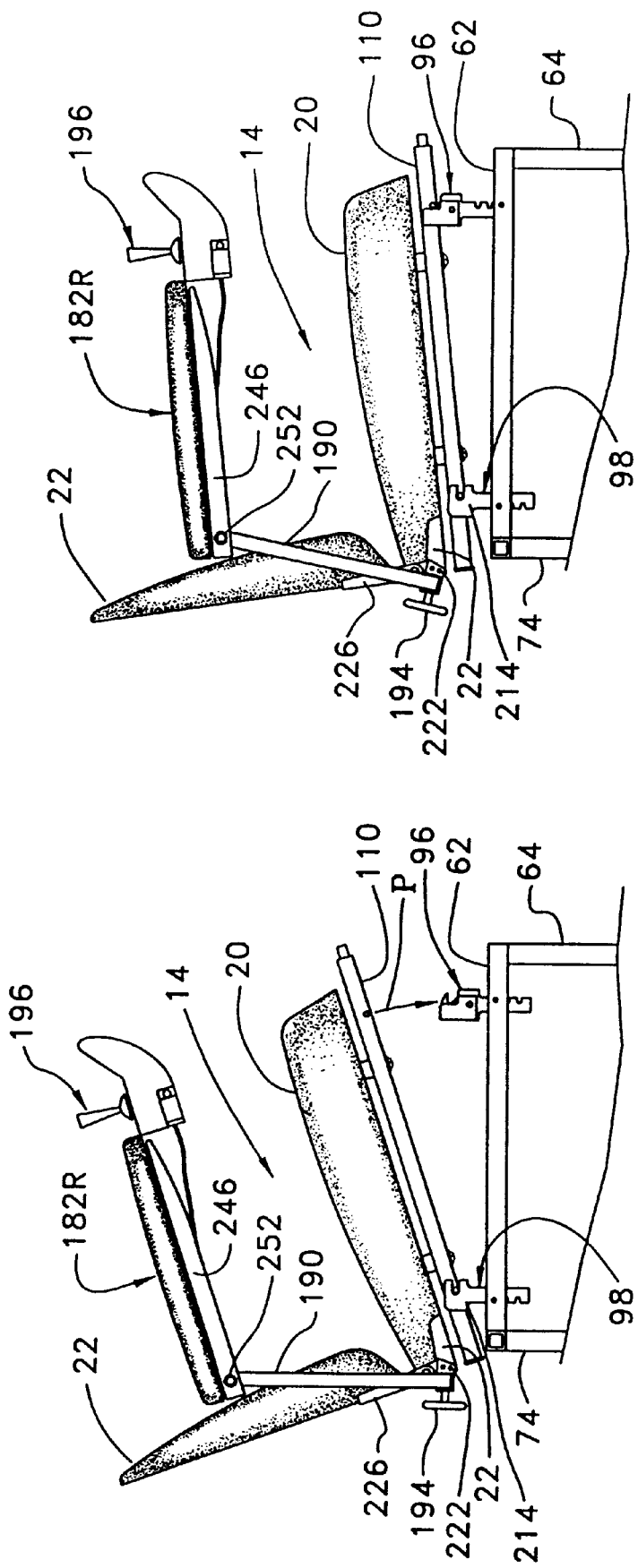

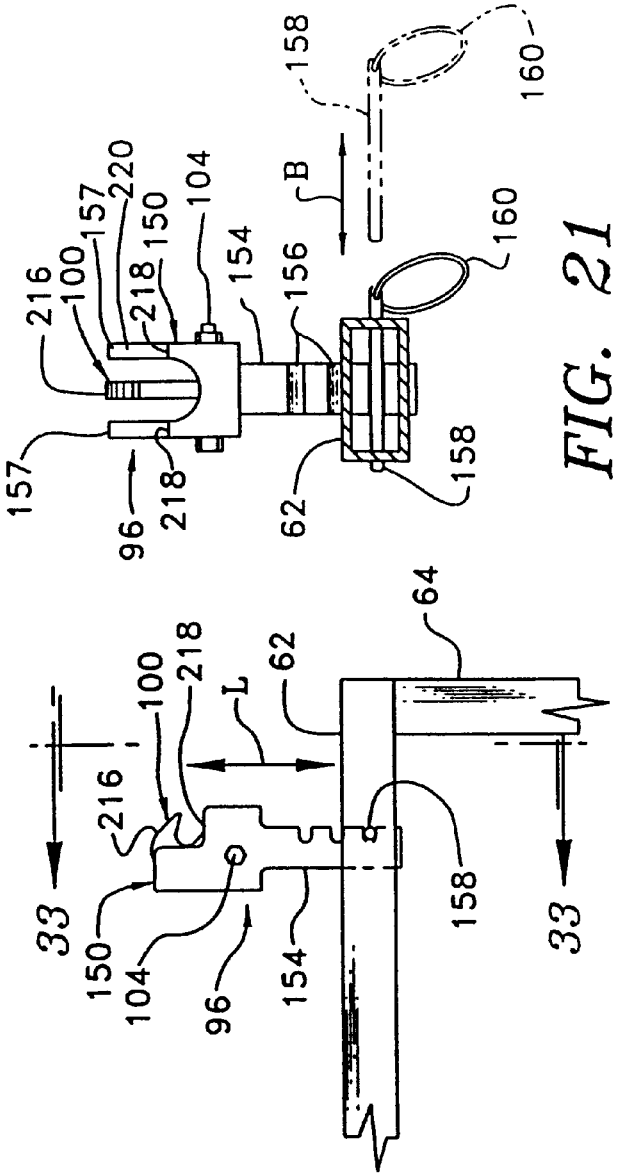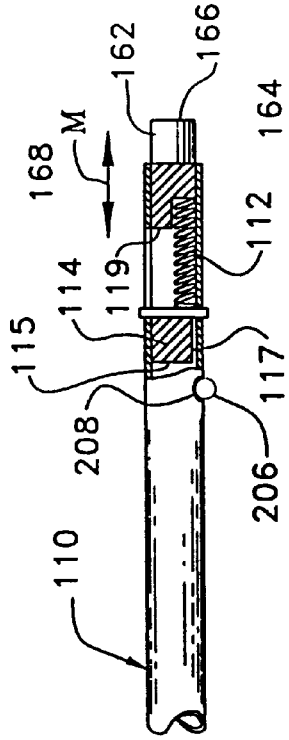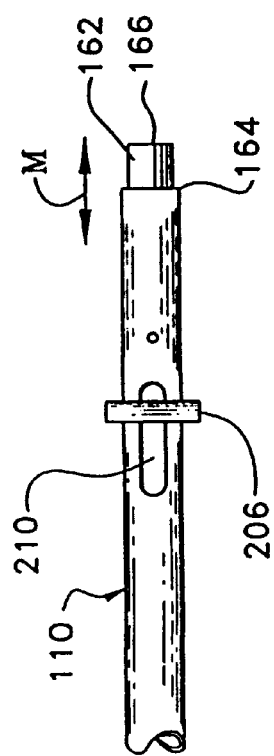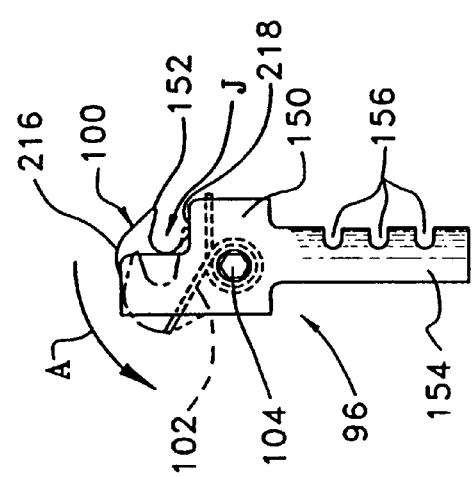

CURB-CLIMBING POWER WHEELCHAIR

CROSS-REFERENCE TO RELATED PATENT APPLICATIONS

This patent application is based on a provisional U.S. patent application Ser. No. 60/041,973, filed Apr. 15, 1997 in the names of Walter E. Schaffner, James P. Mulhern, Stephen J. Antonishak and Gerald J. White, entitled CURB-CLIMBING FRONT WHEEL DRIVE POWER WHEELCHAIR, the benefit of the filing date of which is hereby claimed under 35 U.S.C. §120. This patent application is also a continuation-in-part of U.S. patent application Ser. No. 29/056,607 now D397,645, filed Jul. 3, 1996 in the name of Walter E. Schaffner, entitled MOTORIZED WHEELCHAIR, U.S. patent application Ser. No. 08/742,972, filed Nov. 1, 1996 in the names of Walter E. Schaffner, James P. Mulhern and Stephen J. Antonishak, entitled POWER WHEELCHAIR, U.S. patent application Ser. No. 08/748,214, filed Nov. 12, 1996 in the name of Walter E. Schaffner now U.S. Pat. No. 5,944,131, entitled FRONT WHEEL DRIVE POWER WHEELCHAIR and U.S. patent application Ser. No. 29/067,721, filed Jan. 31, 1997 now D404,693 in the name of Walter E. Schaffner, entitled MOTORIZED WHEELCHAIR; the benefit of the filing dates of all of these applications is claimed under 35 U.S.C. §120. The disclosures of all of these applications are incorporated herein by reference.

BACKGROUND OF THE INVENTION

1. Field of the Invention

This invention relates to wheelchairs, particularly to powered wheelchairs, for use by handicapped and disabled persons, which can climb curbs.

2. Description of the Prior Art

As used herein, the term "conventional wheelchair", including plurals and variants thereof, denotes manually powered wheelchair apparati of the type generally disclosed in U.S. Pat. No. 3,953,054.

As used herein, the terms "conventional power wheelchair", "known power wheelchair" and "rear wheel drive power wheelchair", including plurals and variants thereof, denote powered wheelchair apparati of the type generally disclosed in U.S. Pat. No. 4,387,325.

Power wheelchairs are known and have been the subject of increasing development efforts to provide handicapped and disabled persons with independent mobility to assist them in leading more normal lives.

Power wheelchairs known heretofore resemble conventional, manual wheelchairs; many such power wheelchairs have merely been conventional wheelchairs equipped with motors. Use of such power wheelchairs sometimes results in the user feeling a stigma in that unthoughtful persons may view the power wheelchair user in a quizzical or even offensive manner.

Known power wheelchairs tend to be large and not particularly maneuverable. These power wheelchairs present difficulties for the user in navigating within conventional dwellings which have not been modified to accommodate such conventional power wheelchairs.

Typical rear wheel drive power wheelchairs, which are conventionally manual wheelchairs modified to be equipped with motors, have tuning circles of about 72 inches in diameter; whereas typical front wheel drive power wheelchairs known heretofore for the most part have turning circles in the neighborhood of 52 inches in diameter. These turning circles are too big for the user of a conventional power wheelchair to reverse the wheelchair direction by turning the wheelchair around within corridors or hallways of conventional office buildings or most homes.

Dual drive motor power wheelchairs are known; one is illustrated in U.S. Pat. No. 5,540,297. Other power wheelchairs are disclosed in U.S. Pat. Nos. 4,513,832; 4,538,857; 5,094,310; 5,145,020 and 5,366,037.

Forward or front wheel drive power wheelchairs are sold by Permobile, Inc. in Woburn, Mass. and have the driving wheels at the extreme forward end of the vehicle chassis thereby requiring substantial space in order to turn the power wheelchair. This large chair turning circle results from the axis of rotation of the chair, when turning, being at the mid-point of the drive wheel axes, which is at the extreme forward end of the chair. Hence, the radius of the chair turning circle cannot be substantially less than length of the chair chassis.

A forward wheel drive power wheelchair of the type sold by Permobile, Inc., with the drive wheels at the extreme forward end of the wheelchair chassis, is disclosed in a brochure entitled "Permobile Power Chair Empowering the Human Spirit" available from that company.

Wheelchairs having relatively large diameter forward wheels located under the central portion of the seat are known; one such wheelchair is disclosed in U.S. Pat. No. 4,538,857.

Known power and manual wheelchairs have significant difficulty in climbing curbs. Curbs may be six to eight inches or even higher. Curbs of this height present very substantial, often insurmountable obstacles for known power wheelchairs.

SUMMARY OF THE INVENTION

In one of its aspects, this invention provides a curb-climbing power wheelchair including a frame, a seat preferably removably connected to the frame, a pair of drive wheels rotatable independently about transverse parallel axes below a portion of the seat supporting an occupant's thighs, motors for driving respective drive wheels with respective motor/drive wheel combinations being pivotally connected to the frame, at least one ground engaging idler wheel connected to the frame behind the drive wheels and anti-tip wheels forward of the drive wheels, above the ground and rigidly connected to the motors for pivotal movement therewith relative to the frame.

In yet another of its aspects, this invention provides a curb-climbing power wheelchair including a frame, a pair of drive wheels rotatable independently about transverse parallel axes relative to the frame, motors for rotating respective ones of the drive wheels pivotally connected to the fame, anti-tip wheels pivotally connected to the frame, being associated with respective ones of the drive wheels and adjustably positionable above ground forward of an associated drive wheel for contacting the ground upon chair forward tipping or encountering an obstacle, and means for pivotally coupling an associated motor and an associated anti-tip wheel for rotation respecting said frame responsively to the motor accelerating the drive wheel.

In still yet another of its aspects, this invention provides a curb-climbing power wheelchair including a frame, a seat removable from the frame without the use of tools, a pair of drive wheels rotatable independently about transverse parallel axes below the seat, motors for driving respective drive wheels and being pivotally connected to the frame, electrochemical means for powering the motors, a decorative body, anti-tip wheels positioned forward of the drive wheels and coupled to the motors for pivotal movement therewith respecting the frame as the wheelchair accelerates or decelerates with the body being manually directly liftable off of the frame in the absence of the seat without use of tools.

BRIEF DESCRIPTION OF THE DRAWINGS

FIG. 8 is a view of a wheelchair seat back looking in the same direction as FIG. 3, illustrating wheelchair seat arm width adjustment aspects of the invention.

FIG. 13 is a broken side view of a seat and an upper portion of a frame for a power wheelchair as illustrated in FIGS. 2 through 6, including means operable responsively to manually generated force for releasably connecting the seat to the frame, illustrating certain aspects of the invention.

FIG. 14 is a broken side view of a seat and an upper portion of a frame for a power wheelchair, as illustrated in FIG. 13, showing the seat support structure partially engaged with the frame.

FIG. 15 is a broken side view of a seat and an upper portion of a frame similar to FIGS. 13 and 14, showing the wheelchair seat mounted on the frame in a position tilted back relative to the position illustrated in FIG. 13.

FIG. 16 is a broken side view of a seat and an upper portion of a frame, similar to FIGS. 13 through 15, depicting the operation of means for releasably connecting the seat to the frame.

FIG. 17 is a side view taken at the position of the circle marked FIG. 17 in FIG. 13 illustrating a latch portion of the means for releasably connecting the seat to the frame, FIG. 18 is a side view taken at the same position as FIG. 17 illustrating the seat subframe ready to engage a latch portion of the means for releasably connecting the seat to the frame.

FIG. 19 is a side view of the latch illustrated in FIGS. 17 and 18, depicting movement of latch parts.

FIG. 20 is a view of the portion of a frame and a latch illustrated in FIGS. 17 and 18, taken at the same position, illustrating vertical adjustment of a seat support member.

FIG. 21 is a front elevation of the structure illustrated in FIG. 20 taken at arrows 21—21 in FIG. 20.

FIG. 22 is a partially broken view looking upwardly of a portion of the seat subframe taken at arrows 22—22 in FIG. 18.

FIG. 23 is a partially broken side sectional view of the structure illustrated in FIG. 22.

FIG. 24 is a side view of an arm of a wheelchair seat as illustrated generally in FIGS. 13 through 16, showing the manner in which the arm may be swung upwardly.

FIG. 25 is an enlarged view of structure illustrated in the circle marked FIG. 25 in FIG. 24.

FIG. 26 is an enlarged view of structure illustrated in FIG. 8 taken at the position indicated by the circle marked FIG. 26 in FIG. 8.

DETAILED DESCRIPTION OF THE INVENTION

Figure 1:
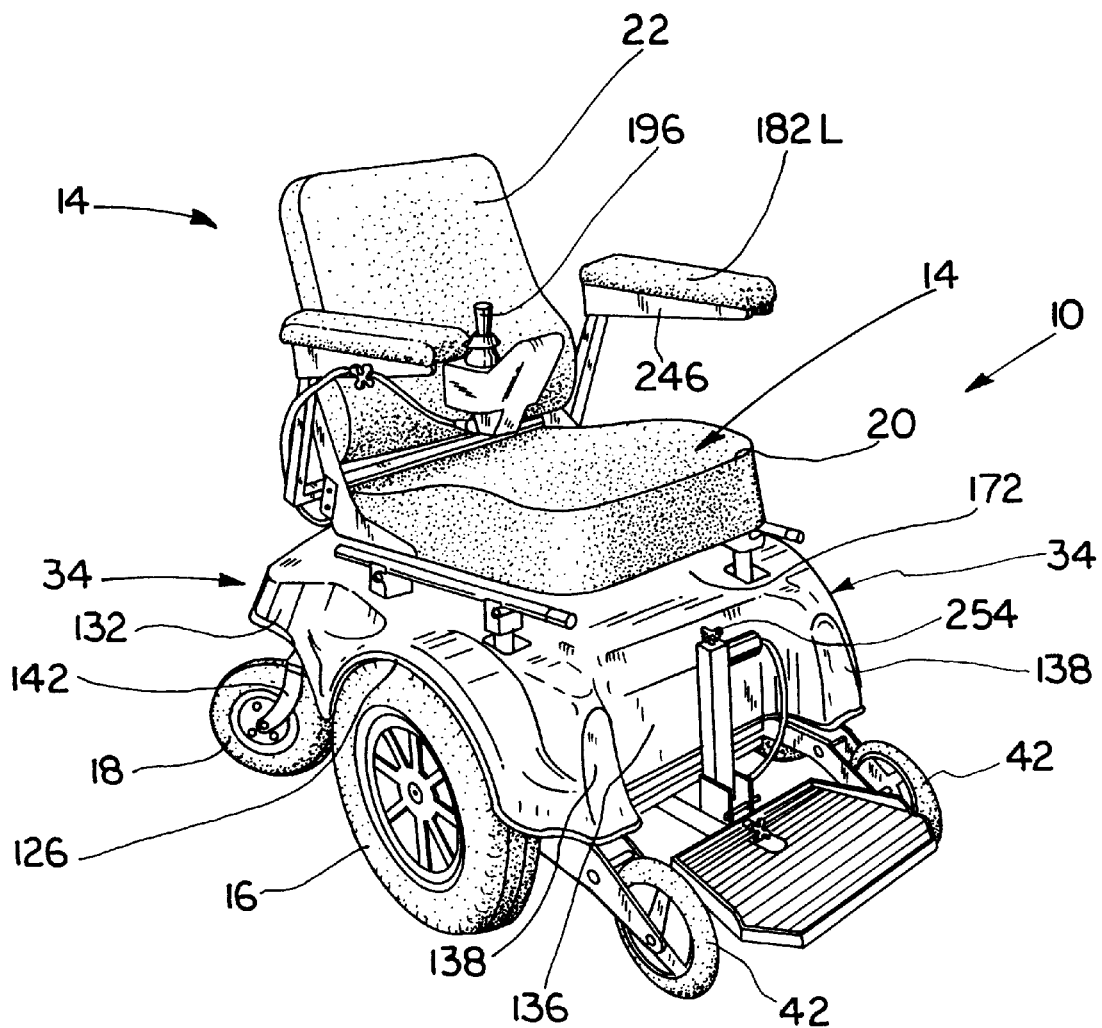
FIG. 1 is a perspective view looking at the right front of a power wheelchair manifesting aspects of the invention.

Referring to the drawings in general and to FIGS. 2 through 8 in particular, a curb-climbing power wheelchair manifesting some of the aspects of the invention is illustrated therein and is designated generally 10. Curb-climbing power wheelchair 10 includes a frame, best illustrated in FIG. 7, which is designated generally 12 and a seat designated generally 14 supported by frame 12. Curb-climbing power wheelchair 10 further includes a pair of drive wheels, each of which has been designated generally 16, which are rotatably connected to frame 12 and are rotatable about transverse axes under a cents portion of seat 14.

An important aspect of this invention is the selected geometry and configuration of the components of the curb-climbing power wheelchair. The inventors recognized in developing the configuration and geometry of the curb-climbing power wheelchair the importance of the sight and balance senses to human beings in connection with operation of power wheelchairs. The eyes provide vision; the otolith organs in the ears provide information regarding balance and changes in position.

The otolith organs provide a point of reference for humans respecting movement. Humans find movements easier to perform and control where such movements are about axes which are aligned with the otolith organs.

A curb-climbing power wheelchair having the axles of the drive wheels essentially vertically aligned with the wheelchair user's otolith organs makes the power wheelchair much, much easier for a wheelchair user to maneuver; this is especially the case for a disabled or handicapped wheelchair user. The less the horizontal separation of the center of rotation of the chair and the otolith organs in the ears, the easier it is for the user to maneuver and to control the power wheelchair.

Ease of maneuverability is provided in the curb-climbing power wheelchair with a seat having a cushion supporting a wheelchair user's thighs and lower portions of the buttocks. The seat has a back for supporting the wheelchair user's back. With seat cushion and back portions, the wheelchair user is in a seated upright position when using the wheelchair.

In this position the wheelchair user's otolith organs are located above the drive wheels of the curb-climbing power wheelchair; the axis about which the drive wheels rotate is below the central portion of the wheelchair seat. This arrangement results in the drive wheel axis being at substantially a longitudinally common location with the otolith organs when the wheelchair user occupies the wheelchair seat and sits with the user's back against the seat back. For severely handicapped or deformed persons, custom seating may be provided thereby to locate the severely disabled or deformed person's otolith organs substantially at a longitudinally common location with the drive wheel axis when the severely disabled or deformed person cannot sit upright.

As is apparent from the drawings, drive wheels 16 of curb-climbing power wheelchair 10 are connected to frame 12 so that each drive wheel 16 rotates about a transverse axis 24 which is below a cushion portion 20 of the curb-climbing power wheelchair seat designated generally 14, and specifically below the portion of cushion 20 which supports the curb-climbing power wheelchair occupant's thighs. As is apparent from the drawings, drive wheels 16 are rotatable about transverse axes which are preferably slightly forward of the longitudinal mid-point of the wheelchair seat 14 and specifically are rotatable about transverse axes which are preferably slightly forward of the longitudinal mid-point of seat cushion 20.

Seat 14 is preferably mounted on frame 12 proximate the longitudinal mid-point of frame 12. Drive wheels 16 are connected to frame 12 and independently rotatable with respect thereto about a transverse axis 24 which is under a central portion of frame 12 adapted to support seat 14. Drive wheels 16, which are rotatably connected to frame 12, are rotatable about a transverse axis 24 which is preferably under a central portion of seat 14. The axis of drive wheels 16 is desirably between the mid-point of seat 12 and the seat forward extremity and is most preferably closer to the mid-point of seat 14 than to the longitudinal extremity thereof.

Cushion portion 20 of seat 14, and especially the forward portion of cushion 20, is the portion of cushion 20 which supports a seat occupant's thighs.

Figure 7:
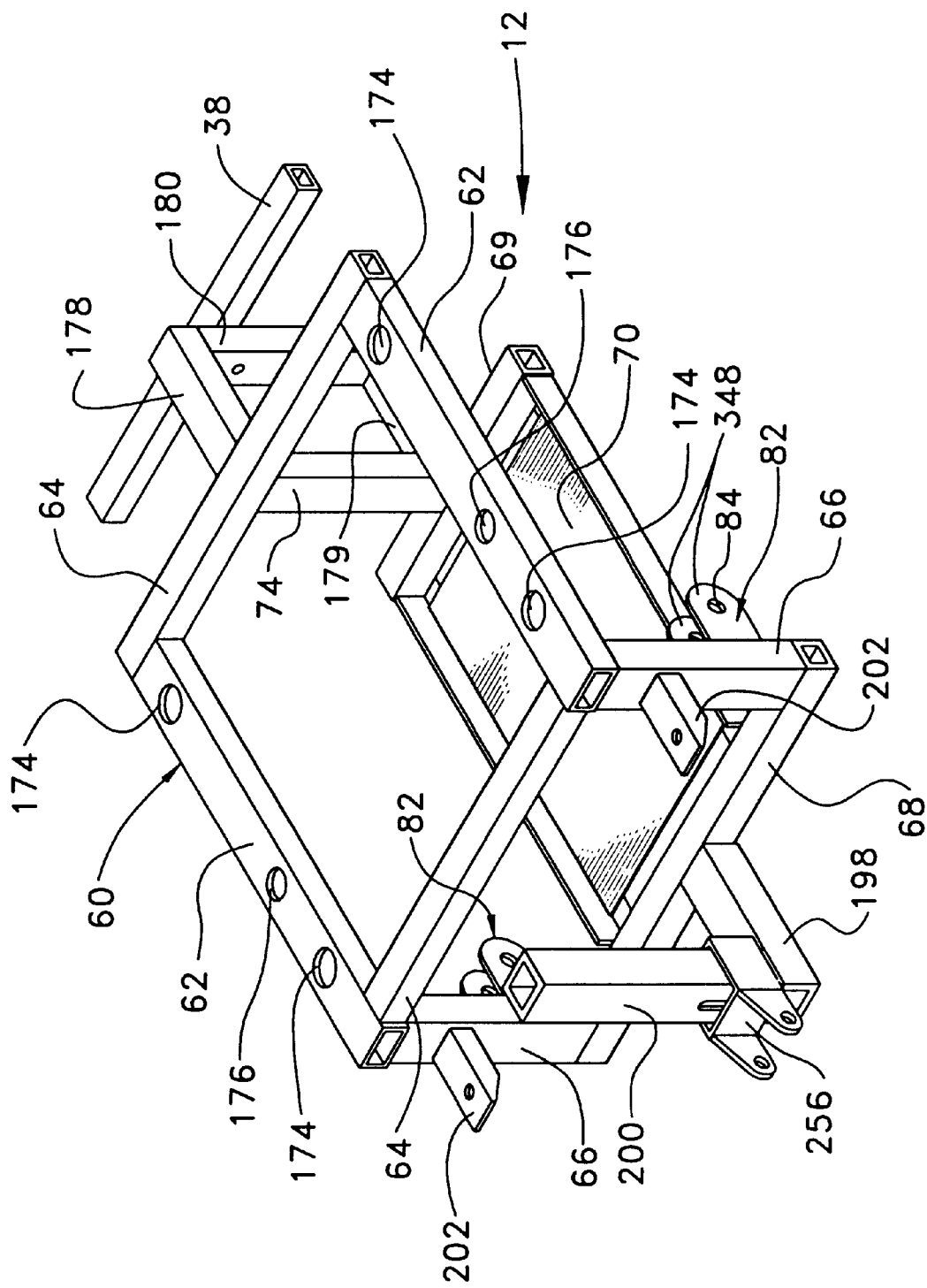
FIG. 7 is an isometric view of a frame for a power wheelchair manifesting certain aspects of the invention.
Figure 9:
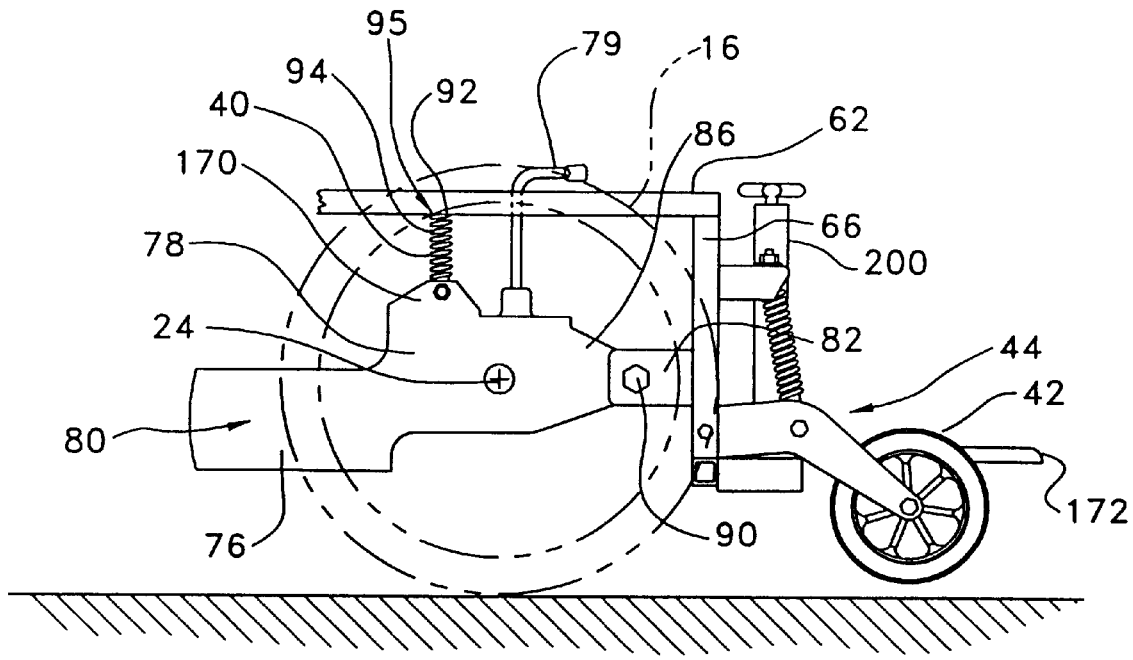
FIG. 9 is a partially broken side view taken at arrows 9—9 in FIG. 4, illustrating power wheelchair independent drive wheel suspension which is disclosed in co-pending U.S. utility patent application Ser. Nos. 08/742,972 and 08/748,214, with the drive wheel illustrated in phantom.
Figure 10:
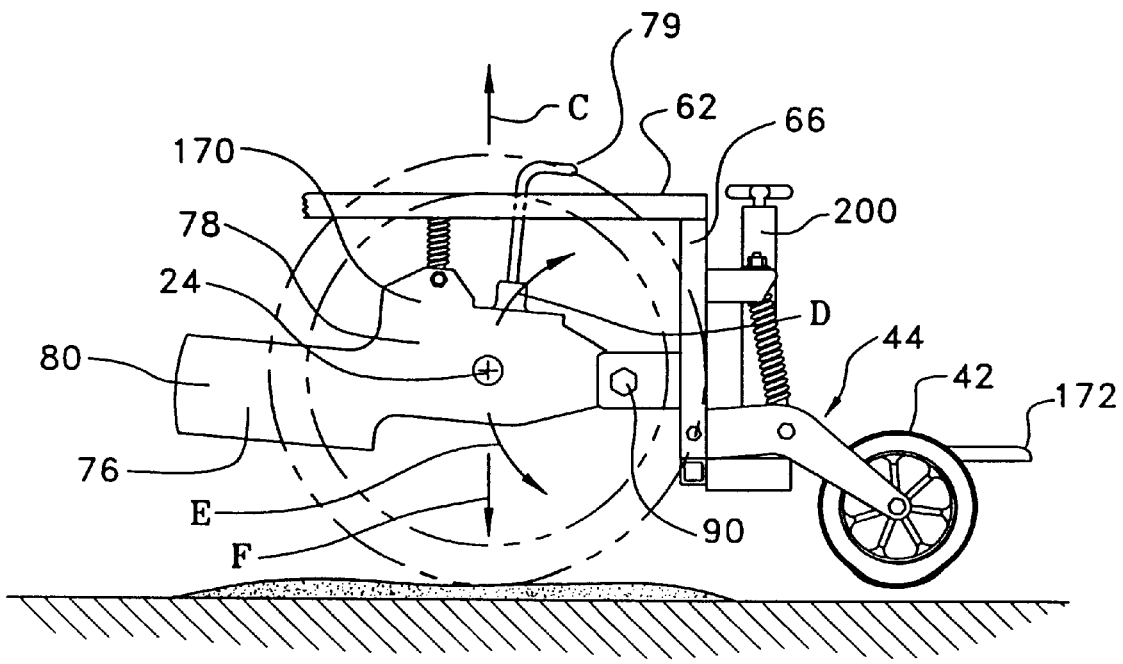
FIG. 10 is a partially broken side view of power wheelchair drive wheel suspension illustrated in FIG. 9, illustrating operation of the drive wheel independent suspension upon the drive wheel encountering an obstacle.
Figure 11:
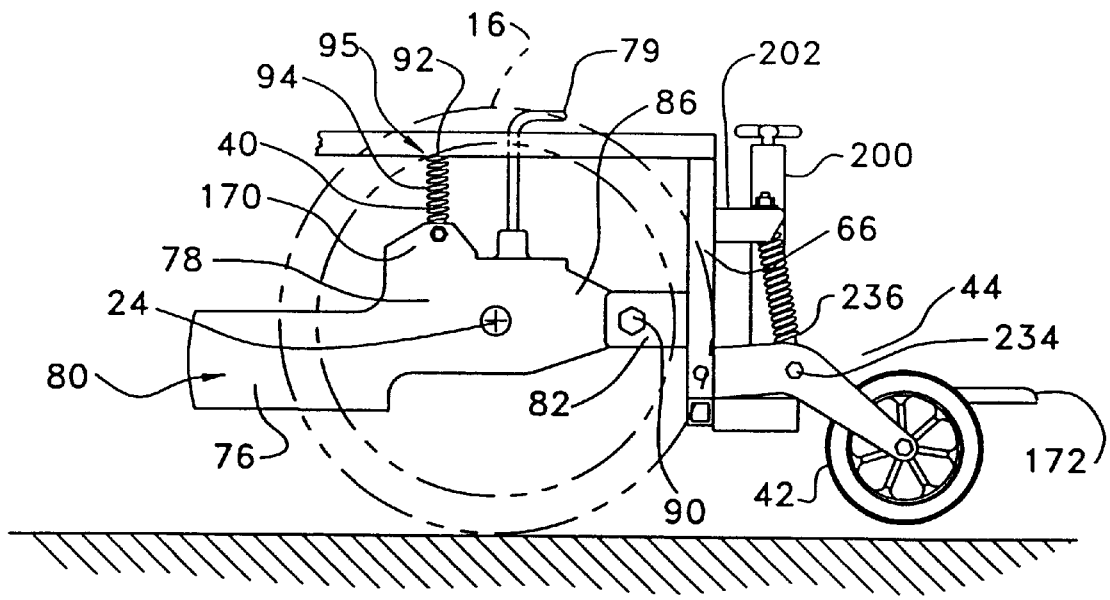
FIG. 11 is identical to FIG. 9 and is presented for purposes of ready reference when considering FIG. 12.
Figure 12:
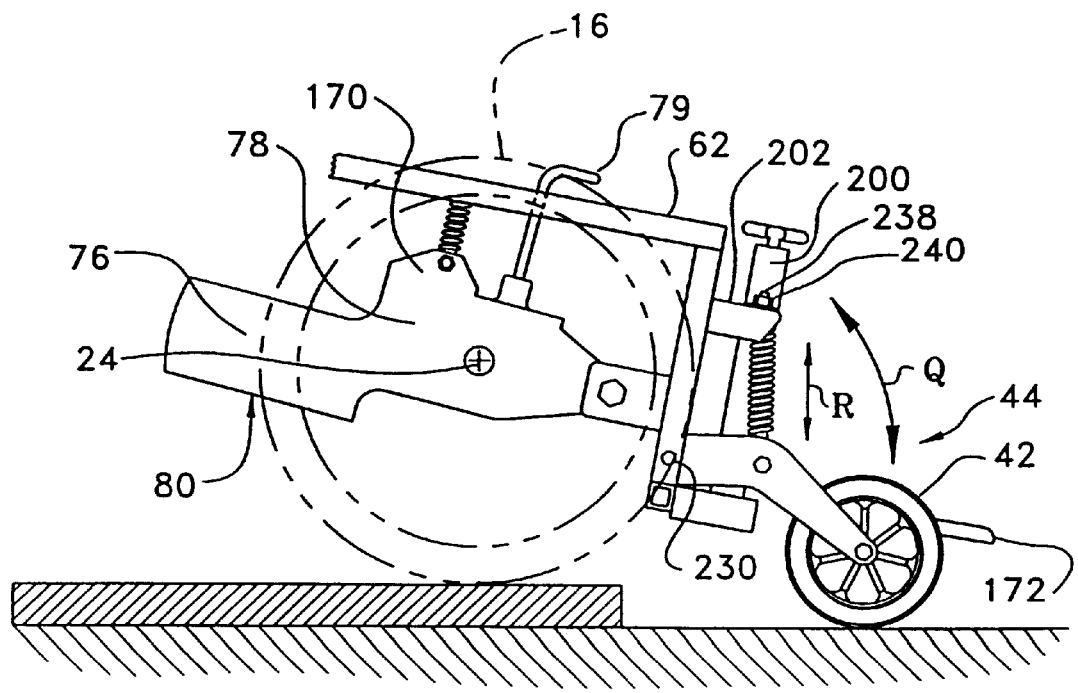
FIG. 12 is a partially broken side view of the drive wheel independent suspension apparatus shown in FIGS. 9 through 11, illustrating aspects of operation of this suspension apparatus in conjunction with independent anti-tip wheel suspension apparatus upon descending down a step to a lower level.

Frame 12 is illustrated isometrically in FIG. 7 and has an upper rectangular frame portion designated generally 60 which includes left and right longitudinally extending tubular upper members 62 and forward and rear transversely extending tubular upper members 64. Members 62 and 64 are preferably welded together. As illustrated in FIG. 7, frame 12 is preferably fabricated of hollow tubular rectangular cross-section steel members welded together.

Frame 12 further includes a pair of forward vertically downwardly extending members 66 which are preferably welded to and extend downwardly from forward extremities of longitudinally extending tubular upper members 62, as illustrated in FIG. 7. A transversely extending forward lower cross-member 68 is preferably welded to lower extremities of downwardly extending members 66 and extends therebetween.

Preferably welded to and extending vertically downwardly from the center of a rear transversely extending tubular upper member 64 is a rear vertically downwardly extending member 74 forming a portion of frame 12.

A pan 70 for carrying electrochemical means, for powering the motors rotating drive wheels 16, in the form of one or more batteries 32 (see FIGS. 4 and 5), may be welded along its forward edge to forward transversely extending lower cross-member 68. A rear transversely extending lower cross-member 69 is welded to the lower extremity of rear vertically downwardly extending member 74. The rear edge of pan 70 may be welded to the forward facing surface of rear transversely extending lower cross-member 69, which is of length equal to the width of pan 70; rear transversely extending lower cross-member 69 is not as long in the transverse direction as transversely extending cross-members 64, 68. Alternatively, pan 70 may be removable from frame 12 and may merely rest at its forward and rearward edges on lower cross members 68, 69 respectively.

Longitudinally extending tubular upper members 62 preferably have apertures 174 formed therein, preferably by drilling or stamping. Apertures 174 receive front and rear upwardly extending seat support members providing manual height and tilt adjustment of the curb-climbing power wheelchair seat without use of tools. Between apertures 174 in longitudinally extending tubular upper members 62 are apertures 176 for mounting a spring-strut portion of drive wheel suspension means of wheelchair 10.

Frame 12 further includes upper and lower longitudinally extending central tubular members 178, 179 respectively. Upper member 178 is preferably welded to and extends rearwardly from the center of rear upper transversely extending tubular member 64. Lower longitudinally extending central tubular member 179 is preferably welded to, and extends rearwardly from, the center of the rearwardly facing surface of rear transversely extending cross-member 69, immediately below the point of welding connection between rear vertically downwardly extending member 74 and rear transversely extending lower cross-member 69.

Extending vertically between longitudinally extending central upper and lower tubular members 178, 179 is outboard vertically extending tubular member 180, which is preferably secured to the rear extremities of longitudinally extending members 178, 179 by welding.

Frame 12 further includes a longitudinally extending forward tubular extension member 198 which is secured to transversely extending lower forward cross-member 68 preferably at the center thereof, and preferably by welding.

An alternative method for attaching a footrest 172 (see FIGS. 1 and 4) to frame 12 is to mount the footrest to an upstanding footrest vertical guide 200 with mechanical means such as a nut and bolt. In such case, box-like frame 256 is first mounted on the upstanding footrest vertical guide 200 utilizing a nut and bolt. The footrest 172 is then bolted to box-like frame 256 for footrest 172. This allows footrest 172 to be adjustably mounted to upstanding footrest vertical guide 200 without welding the components together.

Frame 12 may yet further include the forward upstanding extension member 200 secured by welding to the forward extremity of forward tubular extension member 198 and extending transversely upwardly therefrom, as illustrated in FIG. 7.

Frame 12 may yet further include a pair of eye portions designated generally 82 in FIG. 7, which may consist of a pair of parallel plates 348 affixed to rearwardly facing surfaces of respective vertically downwardly extending forward members 66. The plates 348 constituting eye portions 82 include apertures 84 formed therein where apertures 84 are aligned in respective ones of plates forming eye portion 82 so that each pair of plates may receive shafts for suspension of drive wheels and associated motors and forward anti-tip wheels from eye portions 82, as described below. Eye portions 82, specifically the parallel plate portions thereof, are preferably formed from single pieces of metal by bending the pieces of metal into a U-shaped bracket where the upstanding portions of the "U" define the longitudinally extending rearwardly facing plates 348 of eye portion 82. Such one piece, U-shaped bracket construction of eye portion 82 is visible in FIG. 4.

Frame 12 may yet further include a pair of forwardly extending pedestals 202 secured to forwardly facing surfaces of forward vertically downwardly extending members 66, preferably by welding. Pedestals 202 may be secured at positions on members 66 somewhat below the upper extremities thereof, as illustrated in FIG. 7. Forwardly extending pedestals 202 provide points of attachment for spring-strut combinations 44 which may be provided to moderate arcuate movement of anti-tip wheels 42, and the drive motors which are associated therewith, and are preferably fixedly connected thereto, relative to frame 12. The spring-strut combinations 44 and anti-tip wheels 42 are not illustrated in FIG. 7 but are shown in FIGS. 2, 4 through 6 and 9 through 12; the preferred construction is illustrated in FIGS. 28 through 36.

Pan 70 is preferably welded to a forward portion of rear vertically downwardly extending member 74 as well as to a rear portion of transversely extending lower tubular cross-member 68. The preferably welded, box-like construction of frame 12 illustrated in FIG. 7 provides a rigid, high strength frame for curb-climbing power wheelchair 10.

Figure 2:
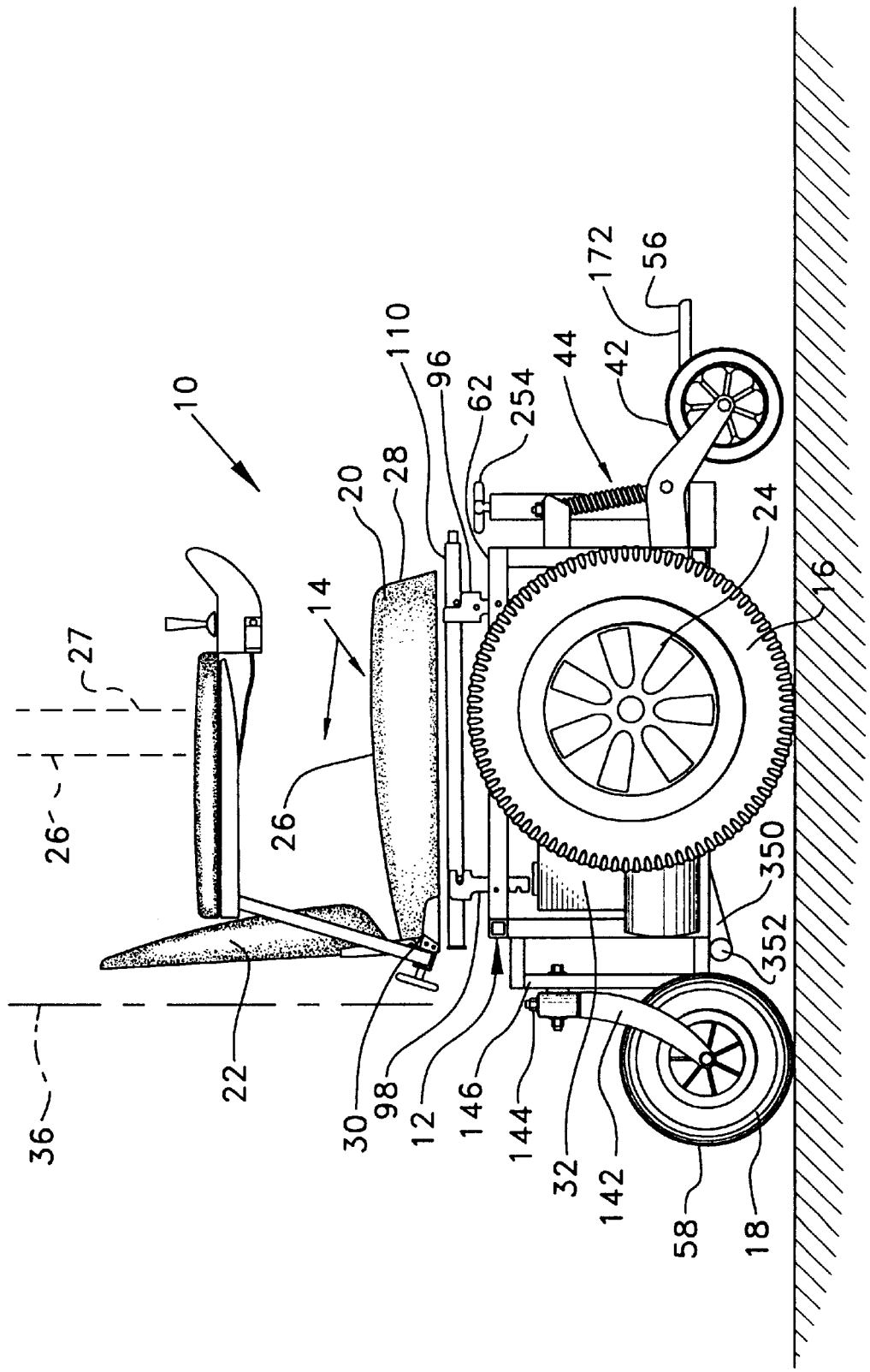
FIG. 2 is a side view of a power wheelchair with the decorative body removed, illustrating certain aspects of the invention.

As illustrated in FIG. 2, drive wheels 16 are preferably oriented and positioned respecting frame 12 so that the axis of rotation 24 of drive wheels 16 is between the longitudinal mid-point 26 and forward extremity 28 of seat 14. Most desirably the axis of rotation 24 of drive wheels 16 is closer to the mid-point 26 of seat 14 than to the forward longitudinal extremity 28 of seat 14.

Seat 14 preferably includes a cushion portion 20 and a back portion 22. In FIG. 2 the longitudinal mid-point of seat 14, specifically the longitudinal mid-point of seat cushion 20, is identified as 26. The forward longitudinal extremity of seat 14 is identified as 28 while the rear longitudinal extremity of seat 14, and specifically seat cushion 20, is identified as 30. The axis of rotation of drive wheel 16 is identified as 24. In FIG. 2, the longitudinal mid-point 26 of seat 14, specifically of cushion 20 of seat 14, is indicated by both a lead line from an indicator numeral and by a dotted vertical line. The longitudinal location of the axes of rotation of drive wheels 16 is indicated by dotted vertical line 27 in FIG. 2.

Figure 4:
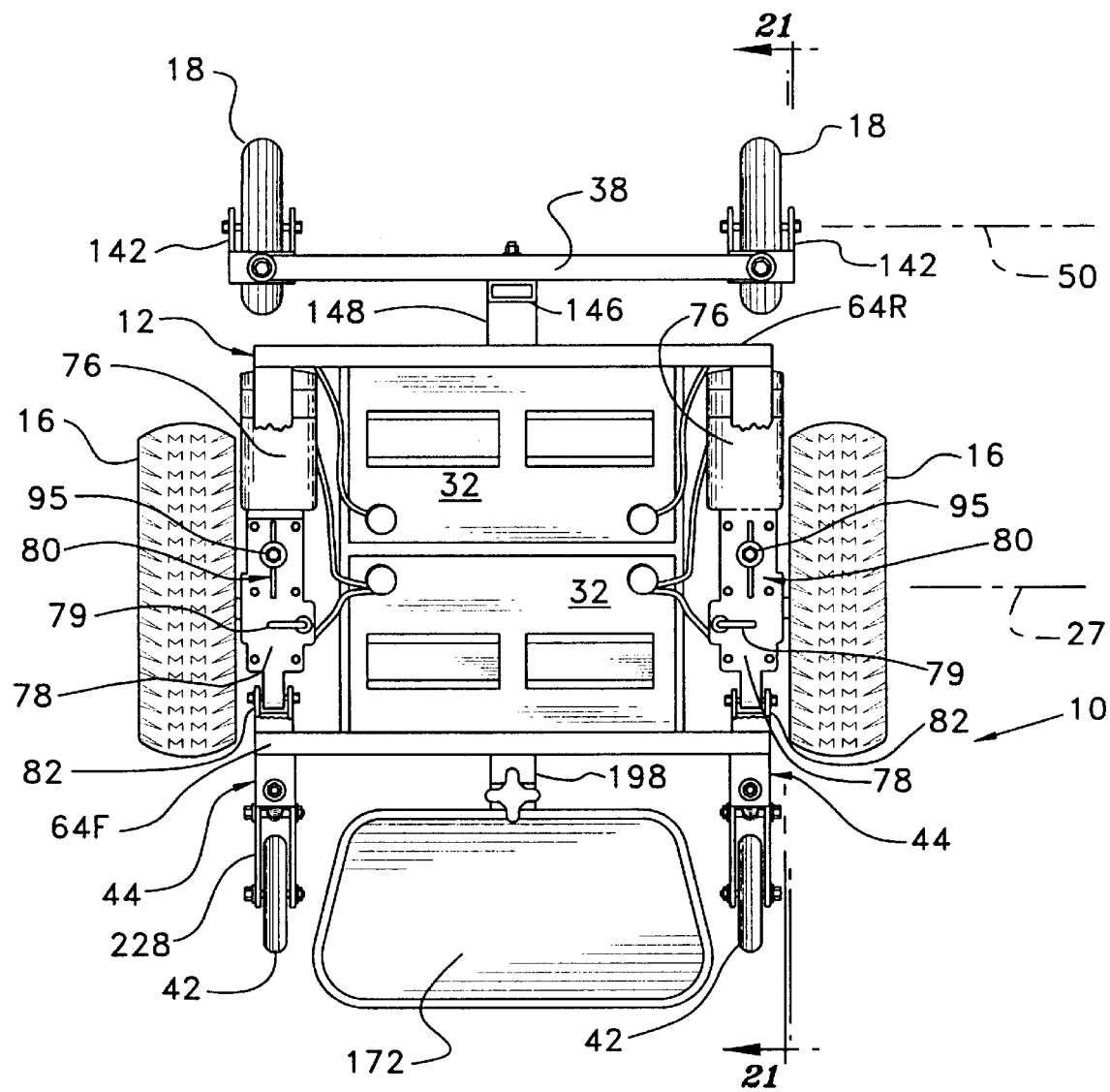
FIG. 4 is a top view of the power wheelchair illustrated in FIGS. 2 and 3, with the power wheelchair seat and decorative body removed, illustrating certain aspects of the invention.

Curb-climbing power wheelchair 10 further includes at least one battery, which has been designated generally 32, and is carried by frame 12 (specifically by pan 10). As illustrated in FIG. 4, curb-climbing power wheelchair 10 further includes motors 76 powered by one or more batteries 32 for driving drive wheels 16; each drive wheel 16 preferably has a drive motor 76 associated therewith. Drive motors 76 are reversible and drive an associated drive wheel independently. As a result, power wheelchair 10 can be made to pivot or turn, thus able to effectively spin about a vertical axis, by motors 76 rotating drive wheels 16 in opposite directions.

Figure 3:
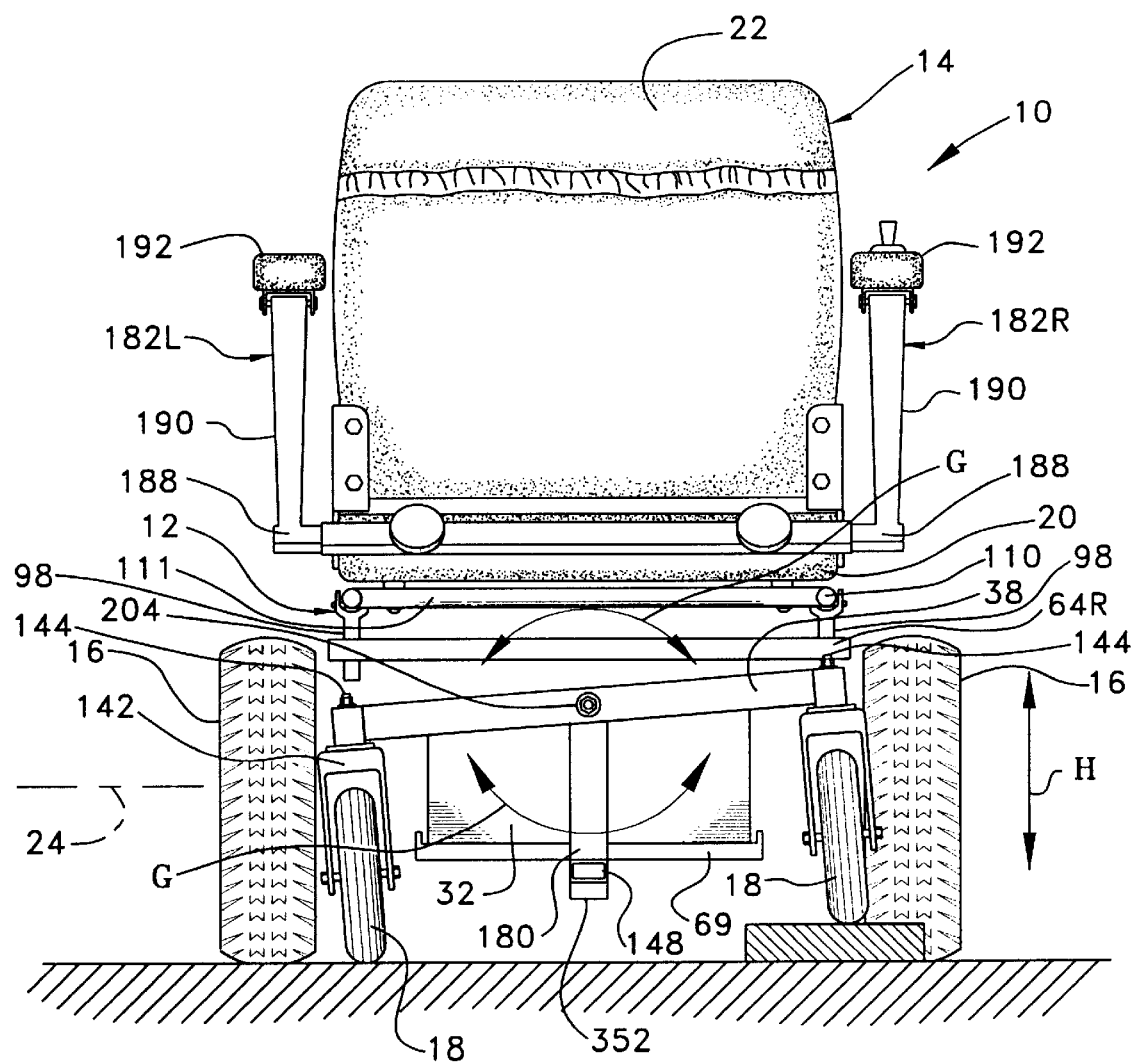
FIG. 3 is a rear view of the power wheelchair illustrated in FIG. 2, with the decorative body similarly removed, illustrating certain aspects of the invention

As illustrated in FIGS. 2 and 3, curb-climbing power wheelchair 10 further includes a pair of idler wheels 18 which are the rear ground engaging wheels of curb-climbing power wheelchair 10; drive wheels 16 are the forward ground engaging wheels of curb-climbing power wheelchair 10. Hence the curb-climbing power wheelchair 10 of the invention is a front wheel drive curb-climbing power wheelchair. However, many aspects of this invention are not limited to front wheel drive or curb-climbing power wheelchairs.

In the preferred embodiment of the invention rear ground engaging wheels 18 are caster-type idler wheels, which are pivotally mounted for rotation about vertical axes.

The curb-climbing power wheelchair 10, as illustrated in the drawings, has the drive wheels 16 positioned towards the longitudinal center 27 of the curb-climbing power wheelchair (FIG. 2). This configuration concentrates, and effectively maximizes, weight on drive wheels 16. A curb-climbing power wheelchair so constructed in accordance with the drawings and having dimensions as set forth herein, when carrying a 160 pound passenger, results in about eighty-two percent (82%) of the total weight of the curb-climbing power wheelchair and passenger being carried by drive wheels 16.

The configuration illustrated in the drawings, positioning a large amount of total chair and passenger weight over drive wheels 16, provides several benefits. Primarily, overall traction is increased. With increased traction, better obstacle climbing ability results, increasing overall capability and usability of the curb-climbing power wheelchair. Additionally, with increased traction, deceleration is more positive and more predictable. This is an important safety factor in light of the fact that most, if not all, users of curb-climbing power wheelchairs manifesting the invention will be handicapped or disabled persons With increased traction also comes superior straight line stability. The mass centralization created by the battery placement and the user position in the curb-climbing power wheelchair contributes to straight line stability by reducing the "pendulum effect" present in many prior art power wheelchairs, where the user and battery weight are effectively removed from the pivot axis of the drive wheels.

Increased traction results in extremely accurate response of the curb-climbing power wheelchair to inputs provided by the wheelchair user through a joystick control. This translates into more predictable and positive handling and a much easier learning curve for the curb-climbing power wheelchair user when the user is first becoming accustomed to the curb-climbing power wheelchair.

Yet another benefit of the geometry of the power wheelchair is an extremely tight turning radius, resulting from the available independent rotation of the drive wheels, in opposite directions. This allows the user of the curb-climbing power wheelchair to gain access to, and to turn around in, confined areas such as those encountered in hallways, bathrooms, small kitchens and office areas.

As illustrated in the drawings, the curb-climbing power wheelchair has an extremely small footprint. Placement of the drive wheels near the center of the curb-climbing power wheelchair results in the curb-climbing power wheelchair having a turning radius of only about nineteen and one-half inches (19½") in the preferred embodiment.

As illustrated in FIGS. 3 and 4, idler wheels 18 located at the rear of curb-climbing power wheelchair 10 are mounted to frame 12 and are pivotable about vertical axes identified 36 in FIG. 2. Idler wheels 18 are not powered and are desirably caster-type wheels. Idler wheels 18 are preferably connected to frame 12 behind drive wheels 16 and, preferably, behind seat 14.

As illustrated in FIG. 3, rear idler wheels 18 are connected to a transverse beam 38 via U-shaped spindles 142 having conventional bearing assemblies 144. With this arrangement, U-shaped spindles 142, and hence rear idler wheels 18, are pivotable about vertical axes 36, shown in FIG. 2, upon wheelchair 10 turning and/or one of rear idler wheels 18 encountering an obstacle such as illustrated in FIG. 3.

Rear idler wheels 18 are rotatably mounted within U-shaped spindles 142 for rotation within the spindles about horizontal axes 50 as illustrated in FIG. 4.

As illustrated in FIG. 3, transverse beam 38 is pivotally connected to frame 12, specifically to the upper portion of outboard vertically extending tubular rear frame member 180. The point of pivotal connection of transverse beam 38 to vertically extending outboard rear frame member 180 is designated 204. Pivotal connection of beam 38 to frame member 180 at 204 is preferably effectuated using a conventional bearing with a pin journaled in the bearing. As illustrated in FIG. 7, member 180 preferably extends upwardly from the lower longitudinally extending frame rear extension member 179, which in turn extends rearwardly from the rear transversely extending lower crossmember 69.

Pivotally mounting transverse beam 38 to vertically extending rear frame member 180 provides a smoother ride in the event wheelchair 10 encounters a bump). As illustrated in FIG. 3, where the right hand one of rear idler wheels 18 has been depicted encountering an obstacle, as right hand idler wheel 18 rides over the obstacle, beam 38 rotates about pivotal connection 204 as indicated by double ended arrows G in FIG. 3. Vertical displacement of right hand idler wheel 18 is depicted by double ended arrow H in FIG. 3; this displacement results from idler wheel 18 encountering the obstacle.

Figure 5:
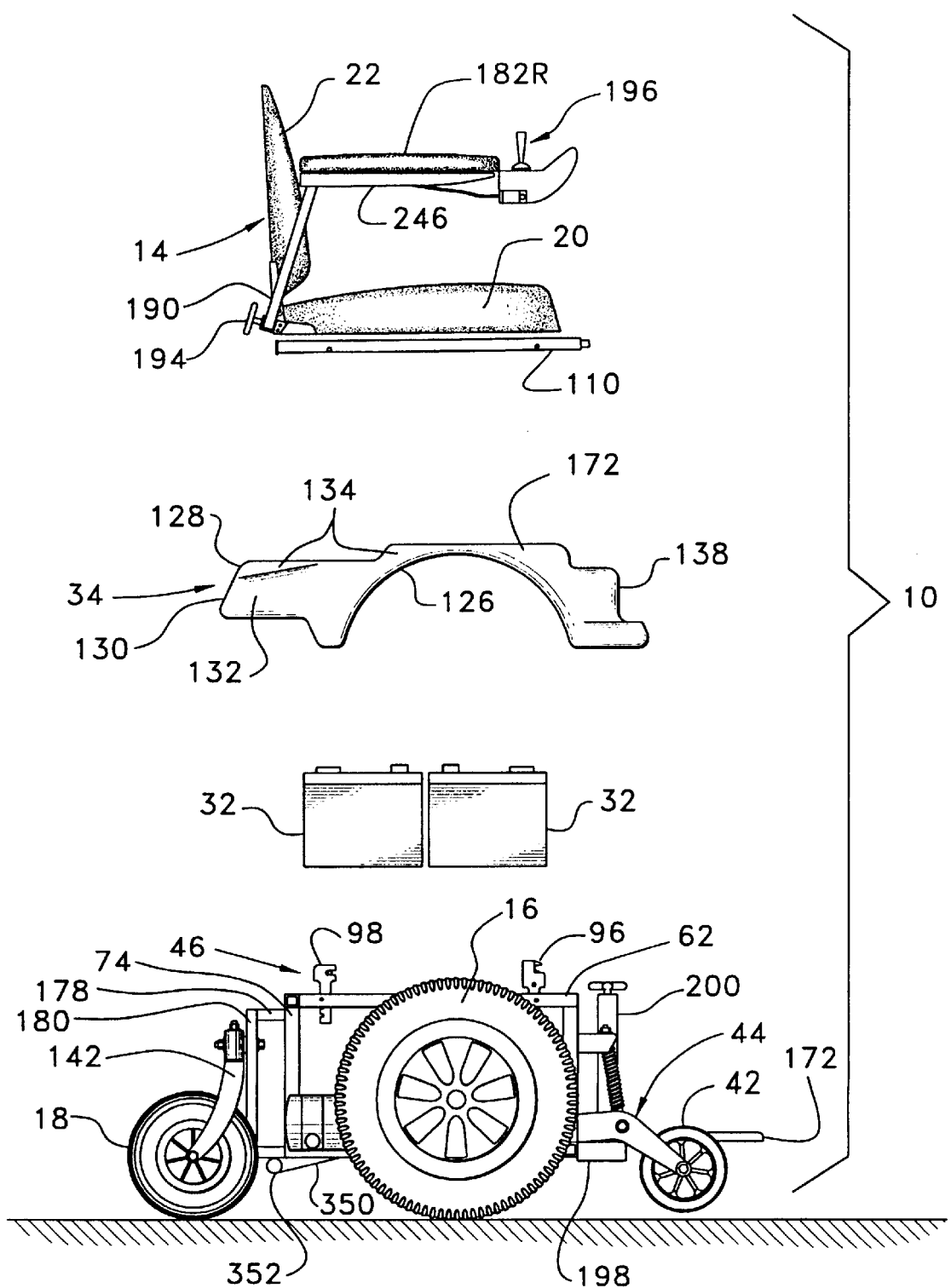
FIG. 5 is an exploded side view of the power wheelchair illustrated in FIGS. 2 through 4 taken in the same direction as FIG. 2, illustrating the manner in which the power wheelchair batteries, decorative body and seat are assembled with the power wheelchair frame and running gear, and illustrating certain aspects of the invention.

As illustrated in FIGS. 2, 3, 5, 6, 8 and 13 through 23, curb-climbing power wheelchair 10 fiber includes means for releasably supporting seat 14 on frame 12 where frame 12 includes upstanding extension portions for supporting seat 14. These upstanding portions are designated generally 46 in FIG. 5 and include rear upstanding seat support members designated 98 and forward upstanding seat support members 96, which are shown in FIGS. 2, 3 and 5.

Rear seat support members 98 extend upwardly, preferably vertically, from frame 12 and are transversely spaced one from another. Similarly, forward seat support members 96 extend upwardly, preferably vertically, from frame 12 and are transversely spaced one from another. Rear seat support members 98 preferably include slots, which are preferably horizontally disposed and preferably face forward seat support members 96. These slots are visible in FIGS. 5, 6, 13, 14, 15 and 16 but have not been numbered, to enhance drawing clarity.

As best illustrated in FIGS. 14, 16, 17, 18, 19, 20 and 21, forward seat support members 96 preferably include hooking members 100 (FIG. 18) which are preferably pivotally mounted in U-shaped frame portions 150 (FIG. 17) of forward seat support members 96. Hooking members 100 are mounted on shafts 104 to be movable by rotation respecting frame portion 150 of forward seat support member 96 as illustrated generally in FIG. 19, where arrow A denotes rotational movement of hooking member 100. In FIG. 19, a hooking member 100 is shown in phantom lines having rotated in the direction of arrow A from its normal operational position illustrated in solid lines.

Thus, hooking members 100 can rotate rearwardly, as indicated by arrow A in FIG. 19, to an orientation such that mouth portions of the hooking members, preferably move at least to a horizontal orientation so that seat 14 may be removed from seat support members 46, specifically from forward upstanding seat support members 96.

Springs 102 about shafts 104 bias hooking members 100 forwardly respecting FIG. 19, in a direction opposite to that indicated by arrow A, to an orientation at which the mouth portion of a slot in hooking member 100 faces below horizontal as illustrated in solid lines in FIG. 19. The mouth portion of hooking, member 100 is designated by arrow J in FIG. 19 and is defined by an opening between a tip 152 of hooking member 100 and a remaining surface 218 of the slot formed in hooking member 100.

As depicted schematically by double ended arrow L in FIG. 20, upstanding seat support portions 46, specifically forward and rear upstanding seat support members 96, 98, are movable upwardly respecting the remainder of frame 12 and specifically respecting longitudinally extending tubular members 62 to which respective forward and rear upstanding seat support members 96, 98 are connected. Forward and rear seat support members 96, 98 are vertically adjustably positionable independently of one another, with respect to longitudinally extending tubular upper member 62, thereby permitting adjustment of height and/or tilt of seat 14 with respect to frame 12, and specifically cushion portion 20 of seat 14.

Height adjustment of forward and/or rear upstanding seat support members 96, 98 may be performed manually, without use of tools. This is facilitated by forward and rear upstanding seat support members 96, 98 residing in apertures 174 formed in tubular members 62 as depicted generally in FIGS. 20 and 21. Upstanding seat support members 96, 98 have shaft portions 154 which are preferably cylindrical so as to preferably slidably reside in the apertures 174 in the upper and lower portions of tubular members 62. Preferably, a plurality of horizontal semi-circular bottomed grooves 156 are formed in each shaft 154; grooves 156 are vertically spaced from one another and aligned at a common position on the periphery of shaft 154, as illustrated in FIG. 19.

Side walls of tubular members 62 are drilled to slidably receive pins 158. Pins 158 are sized to fit in a selected one of horizontal semi-circular bottomed grooves 156 formed in shaft portion 154, as illustrated generally in FIGS. 20 and 21. One pin 158 is provided for each of upstanding seat support members 96, 98 to retain the same in place respecting an associated tubular member 62.

To adjust vertical position of one of seat support members 96, 98, the associated pin 158 is removed. This is normally accomplished by manually pulling on a pull ring 160, which is preferably attached to pin 158 by residence in an unnumbered aperture at one end of pin 158, as indicated generally by double ended arrow B in FIG. 21. Once pin 158 has been removed from a given horizontal semi-circular bottomed groove 156 and is outside tubular member 62, the associated forward or rear seat support member 96, 98 may be moved vertically by hand, either up or down as desired; this vertical adjustment is indicated schematically by double ended arrow L in FIG. 20.

When the seat support member 96 or 98 is in the desired position, pin 158 is replaced. This is done by pushing pin 158 through the aligned apertures in the parallel side walls of tubular member 62, into position in the desired semi-circular bottomed groove 156 in shaft portion 154 of the associated forward or rear seat support member 96, 98, as depicted by double ended arrow B in FIG. 21. This secures seat support member 96 or 98 in position. Seat support member 96 or 98 is precluded from moving vertically, being held in place respecting vertical movement by pin 158 residing within a groove 156 formed in shaft portion 154 of an associated seat support member 96 or 98.

FIGS. 20 and 21 depict interaction of a forward upstanding seat support member 96 and pin 158 to effectuate vertical adjustment of upstanding seat support member 96; the same structure is provided for rear seat support members 98. Hence, front and rear seat support members 96, 98 may be positioned vertically respecting frame 12 independently one of another. This permits cushion portion 20 of seat 14 to be affixed to frame 12 in a level position, accomplished by seat support members 96, 98 being at a common height respecting longitudinally extending tubular upper member 62 in which forward and rear seat support members 96, 98 reside.

Cushion 20 may be tilted back, this is accomplished by having upstanding forward seat support members 96 positioned higher respecting associated longitudinally extending tubular upper member 62 than rear upstanding seat support members 98.

Further alternatively, cushion 20 may be positioned tilted forward by having rear upstanding seat support members 98 positioned higher respecting associated longitudinally extending tubular upper member 62 of frame 12 than forward upstanding seat support members 96.

Since vertical position of upstanding seat support members 96, 98 may be adjusted manually, without use of tools, an attendant or therapist may change the seating position for the curb-climbing power wheelchair user at the home or other premises where the curb-climbing power wheelchair is used; it is not necessary to take the curb-climbing power wheelchair to a dealer or other service facility or to a health care facility to adjust seat height or tilt.

As shown in FIG. 16, seat 14 is preferably mounted on and may be considered to include a subframe designated generally 108 which provides a part of means for connecting seat 14, specifically cushion 20 of seat 14, to frame 12 of curb-climbing power wheelchair 10 so that seat 14 is releasably supported above frame 12 and may be removed from frame 12 by hand, without use of tools.

Subframe 108 preferably includes a pair of circular cross-section longitudinally extending tubular members designated 10 affixed to the bottom of cushion 20 of seat 14. Longitudinally extending tubular members 110 are visible in FIGS. 2, 3, 5, 6, 8 and 13 through 18 and are shown partially broken in FIGS. 22 and 23. As shown in FIG. 3, subframe 108 further preferably includes a pair of transverse tubular members 111, longitudinally separated from one another, extending between and secured to inwardly facing surfaces of longitudinally extending members 110.

Seat 14, specifically cushion portion 20 of seat 14, is secured to subframe 108 via screws passing through tubular members 111 and into the bottom of cushion portion 20 of seat 14. Tubular members 111 are preferably separated from the lower, downwardly facing surface of cushion 20 of seat 14 by thermoplastic washers which are illustrated in FIG. 3. Neither the screws which pass through the thermoplastic washers to secure tubular members 111 to the bottom of cushion portion 20 of seat 14 nor the thermoplastic washers themselves have been numbered in FIG. 3 to aid drawing clarity.

Longitudinally extending tubular members 110 preferably house pushbuttons 114 having coil springs 112 therewithin at the forward portions thereof as illustrated in FIGS. 22 and 23. Pushbutton 114 has a portion 162 which extends longitudinally forwardly out of tubular member 110 and a longitudinally forwardly facing end surface 166 for receiving axial manually generated force to move pushbutton 114.

Pushbutton 114 is preferably of unitary construction. The section view illustrated in FIG. 23 is a vertical section respecting FIG. 22; for this reason pushbutton 114 in FIG. 23 appears to be a two part member. In fact, pushbutton 114 is preferably a single, unitary member having an opening therein, appearing as an open space 168 in FIG. 23.

A roll pin 164 preferably extends through the walls of tubular member 110 for limiting axial travel of pushbutton 114.

The open void 168 appearing in pushbutton 114 shown in FIG. 23 houses roll pin 164 and spring 112. Spring 112 is maintained in compression between roll pin 164, which extends through the wall of tubular member 110 and remains stationary respecting tubular member 110, and an unnumbered internal shoulder portion of pushbutton 114 against which spring 112 abuts at its right hand extremity viewed in FIG. 23.

With spring 112 under compression, a user applying manually generated axially oriented force to exterior surface 166 urges pushbutton 114 to the rear (to the left in FIGS. 22 and 23). The longitudinally extreme left end 115 of pushbutton 114, in FIG. 23, at the end opposite from surface 166, passes over forward transverse rod 206, since there is a slight clearance provided by a relief 117 in the surface of pushbutton 114 facing rod 206 and rod 206 itself as illustrated in FIG. 23. Relief 117 permits longitudinally extreme left end surface 115 of pushbutton 114 at the left extremity of travel of pushbutton 114 to contact forward facing surface 216 of hooking member 100 (FIG. 19) thereby rotating hooking member 100 in the direction indicated by arrow A in FIG. 19, against the bias applied thereto by spring 102.

When pushbutton 114 has traveled the full permissible length of its longitudinal travel within tubular member 110, to the left in FIG. 23, and a shoulder portion 119 of pushbutton 114 contacts toll pin 164, pushbutton 114 pushes hooking member 100 sufficiently that hooking member 100 rotates into a position at which the mouth indicated by arrow J in FIG. 19 is slightly open upwardly, as illustrated by the phantom line depiction of hooking member 100 in FIG. 19, and rod 206 is no longer constrained by hooking member 100. This permits the user to lift seat 14 vertically upwardly thereby removing seat 14 from forward seat support member 96 without the use of tools.

Springs 112 are under compression. When manual force is applied to exterior button portion 166 in the axial direction indicated generally by double ended arrow M in FIGS. 22 and 23, pushbutton 114 moves to the left in FIGS. 22 and 23, against the resilient force continuously applied to pushbutton 114 by spring 112.

Transverse rod 206 is fixedly retained within an arcuate cut-out 208 formed in the bottom of longitudinally extending tubular member 110 as illustrated in FIG. 23. Rod 206 is preferably secured to tubular member 10 by welding.

Longitudinally elongated slot 210 in the bottom of tubular member 110, as illustrated in FIG. 22, receives hooking member 100, thus permitting mouth J of hooking member 100 to rotate and close over rod 206 in response to the bias of spring 112.

Pushbutton 114 can traverse substantially the longitudinal length of slot 210 under the influence of axial force manually applied to exterior surface 162 against bias applied by spring 112.

"Axial" force denotes force such as can be applied in a single direction by pushing with the palm of the hand. One of the major advantages of the curb-climbing power wheelchair is that seat 14 may be removed from frame 12 and reengaged with frame 12 solely by application of such axial force such as may be applied using the palm of the hand. Use of the thumb is not required. This is extremely helpful for elderly, infirm, disabled and handicapped persons such as those who through the effects of arthritis or other diseases, or from injury or accident, have lost use of, or strength in, the thumb and/or other fingers. The required axial force may be applied in a single direction just by pushing with the palm.

Axially extending tubular members 110 further include rear transverse rods 212, illustrated in FIG. 16, which are resident within rear arcuate cut-outs similar to forward arcuate cut-outs 208 illustrated in FIG. 23, but which have not been numbered in the drawings. Rear transverse rods 212 are preferably secured to longitudinally extending tubular members 110 by welding, similar to forward transverse rods 206. However, at the position on longitudinally extending tubular members 110 at which rear transverse rods 212 are connected thereto, there is no slot analogous to axial slot 210 illustrated in FIGS. 22 and 23, nor is there any spring or pushbutton structure analogous to pushbutton 114, spring 112 and exterior surface 166 illustrated in FIGS. 22 and 23.

Rear seat support members 98 are similar to forward seat support members 96 in that rear seat support members 98 also include an upwardly facing U-shaped frame portion similar to that of U-shaped frame portion 150 of forward seat support members 96 (FIG. 19). The U-shaped frame portion of a rear seat support member 98 is illustrated in elevation in FIGS. 13 through 16. Rear seat support members 98 include a pair of spaced-apart vertically upstanding walls, one of which is visible in the view presented by FIGS. 13 through 16 and is designated 214 in the drawings.

Walls 214 are separated transversely sufficiently to receive longitudinally extending tubular member 110 therebetween as generally illustrated in FIGS. 13 through 16. Walls 214 each preferably have parallel, transversely aligned forwardly opening longitudinally elongated slots 211 formed therein as shown in FIG. 16. The slots 211 in walls 214 of rear seat support members 98 receive rear transverse rods 212 which are affixed to lower portions of longitudinally extending tubular members 110 closer to the rear terminus thereof than to the forward terminus, as illustrated in FIG. 16. Hence, rear transverse rods 212 may be easily slid into the slots in walls 214 of rear seat support members 98. Rear transverse rods 212 are similar to forward transverse rods 206.

As shown in FIG. 16, rear seat support members 98 include shafts 154 which, as described above, are preferably cylindrical in configuration, to preferably slidably reside in holes in the upper and lower portions of tubular members 62. Rear seat support members 98 are retained in position respecting tubular members 62 using pins 158 received in a selected one of semi-circular bottomed grooves 156 formed in shaft portions 154, as discussed above and as shown in the drawings (FIGS. 20, 21) respecting the forward seat support members 96.

However, as illustrated in FIG. 16, semi-circular bottomed grooves 156 formed in shaft 154 of rear seat support member 98 are formed facing the rear of the curb-climbing power wheelchair; this provides assurance that the curb-climbing power wheelchair in general and the seat mounting system in particular is properly assembled. If rear seat support member 98 is inserted into longitudinally extending tubular frame member 62 backwards, with slot 210 facing towards the rear, rear seat support member 98 cannot be secured in place because pin 158 will not be able to engage a semi-circular bottomed groove 156 but rather will interfere with a solid portion of shaft 154 of rear seat support member 98, as is apparent from FIG. 16.

Seat support members 96, 98 are preferably plastic composite materials, most preferably glass filled nylon. These materials are stronger in compression than in tension. Positioning forward and rear seat support members 96, 98 in the manner illustrated, with the grooves of the respective forward and rear seat support members facing oppositely, takes advantage of the higher compression strength characteristic of the glass filled nylon, providing maximum strength regions in the respective seat support members resisting stresses received when wheelchair 10 is rapidly decelerated or accelerated.

To secure seat 14 in position on frame 12, an individual lifts seat 12 first to position circular cross-sectioned longitudinally extending tubular members 110 of subframe 108 between the upstanding walls of rear seat support member 98 and then to position rear transverse rods 212 in a position within forwardly opening longitudinally elongated slots 211 as indicated generally by arrow N in FIG. 16. By initially positioning circularly cross-sectioned longitudinally extending tubular members 110 of subframe 108 between the respective walls of rear seat support members 98, this helps to align rear transverse rods 212 in a position to easily engage forwardly opening longitudinally elongated axial slots 211, all as indicated by arrow N in FIG. 16. Once rear transverse rods 212 engage slots 211, rearward force is applied to seat 14, specifically to cushion 20, to slide rear transverse rods into flush engagement with the closed bottoms of horizontal slots 211 formed in walls 214 of rear seat support members 98.

Once rear transverse rods 212 are in this position within slots 210, seat 14 may be pivoted downwardly about an axis defined by rear transverse rods 212 in the direction indicated by arrow P in FIG. 14.

As seat 14 pivots about rear transverse rod 212 and moves downwardly as indicated by arrow P in FIG. 14, hooking members 100 are received within slots 210 formed in the bottoms of longitudinally extending tubular members 110. Upwardly extending walls 151, illustrated in FIG. 21, of U-shaped frame portion 150 of forward seat support member 96 are, similar to walls 214 of rear seat support member 98, transversely spaced one from another sufficiently to receive longitudinally extending tubular member 110 therebetween, as depicted in FIG. 17 Receipt of longitudinally extending tubular members 110 between upwardly extending walls 151 of the rear seat support members assists in alignment of the seat with the seat support members when the seat is being engaged with the seat support members, as described above.

As seat 14 pivots downwardly about the axis defined by rear transverse rods 212, rods 206 encounter rounded, downwardly sloped upwardly and forwardly facing surfaces 216 of hooking members 100. Surface 216 is so-designated and illustrated in FIGS. 19, 20 and 21.

As forward transverse rod 206 bears downwardly on surface 216, the rounded configuration of rod 206 and the rounded downwardly sloping configuration of surface 216 resolves the force applied by rod 206 due to the weight of seat 14 to produce a force vector on hooking member 100 which tends to rotate hooking member 100 in the direction illustrated by arrow A in FIG. 19.

As hooking member rotates in the direction indicated by Arrow A in FIG. 19, tip 152 of hooking member 100 rotates into the position illustrated in phantom lines in FIG. 19 thereby opening the mouth indicated by arrow J in FIG. 19. This, permits forward transverse rod 206 to move downwardly to a position at which forward transverse rod 206 is supported by a horizontal shoulder portion 218, illustrated in FIG. 18, of U-shaped frame 150 of forward seat member 96. This arcuate movement is indicated by arrow P in FIG. 14. Horizontal shoulder surface 218 is illustrated and so-designated in FIGS. 18 and 19. Seat 14 in position, with forward transverse rods 206 resting on horizontal shoulder surfaces 218 and engaged with forward seat support members 96, is illustrated in FIGS. 13 and 15.

Once forward transverse rods 206 reside on horizontal shoulder surfaces 218, abutting forward facing shoulder surfaces 220, illustrated in FIG. 21, of forward seat support member 96 and forward transverse rod 206 has cleared tip 152 of hooking member 100, bias applied to hooking member 100 by spring 102 causes hooking member 100 to rotate clockwise in FIGS. 13 through 21 with open slot J closing over forward transverse rod 206. Forward rod 206 is then constrained against forward movement by hooking member 100 and against rearward movement by forwardly facing vertical shoulder surfaces 220. Additionally, rear transverse rod 212 is constrained against rearward movement by the closed bottom of horizontal slot 210 in rear seat support member 98. As a result, seat 14 is securely retained in position, connected by vertical seat support members 96, 98 to frame 12.

To remove seat 14 from wheelchair 10, the procedure is reversed. An individual begins by pushing exterior end surfaces 166 of pushbuttons 114 to the left, along the direction indicated by double ended arrow M in FIGS. 22 and 23. This axially applied manual force moves pushbuttons 114 to the left in FIGS. 22 and 23, against the restraining force constantly applied by spring 112. As pushbuttons 114 move to the left, end surfaces 115 of pushbuttons 116 encounter rounded forwardly and downwardly sloping surfaces 216 of hooking members 100. Continued application of manual force to pushbutton surfaces 166 against bias of spring 112 causes end surfaces 115 of pushbuttons 114 to push against surfaces 216 of hooking members 100, causing hooking members 100 to rotate counter-clockwise as viewed in FIGS. 17 through 19, with tips 152 rotating upwardly and thereby causing the mouth indicated by arrow J to assume a position where it opens slightly upwardly, as illustrated in phantom lines in FIG. 19.

At this position forward ends of longitudinally extendingly tubular members 110 may be lifted since forward transverse rods 206 are no longer restrained against vertically upward movement by hooking members 100. Hence seat 14 may be moved upwardly in a pivotal fashion about a pivot defined by rear transverse rods 212, with seat 14 moving in a direction opposite that indicated by arrow P in FIG. 14. Once seat 14 has been rotated somewhat in a direction opposite to arrow P in FIG. 14, seat 14 may be moved horizontally, to the right viewing FIG. 14, thereby disengaging rear transverse rods 212 from the horizontal forwardly facing open slots formed in walls 214 of rear seat support members 98 and completely disengaging seat 14 from frame 12.

As illustrated in FIG. 4, curb-climbing power wheelchair 10 preferably includes two motors for driving respective drive wheels 16. These motors are designated generally 76 and are each resident within a preferably rigid housing (not shown) which houses, in addition to a motor 76, a transmission 78 for transferring driving rotation from an output shaft of motor 76 to an associated drive wheel 16.

Figure 28:
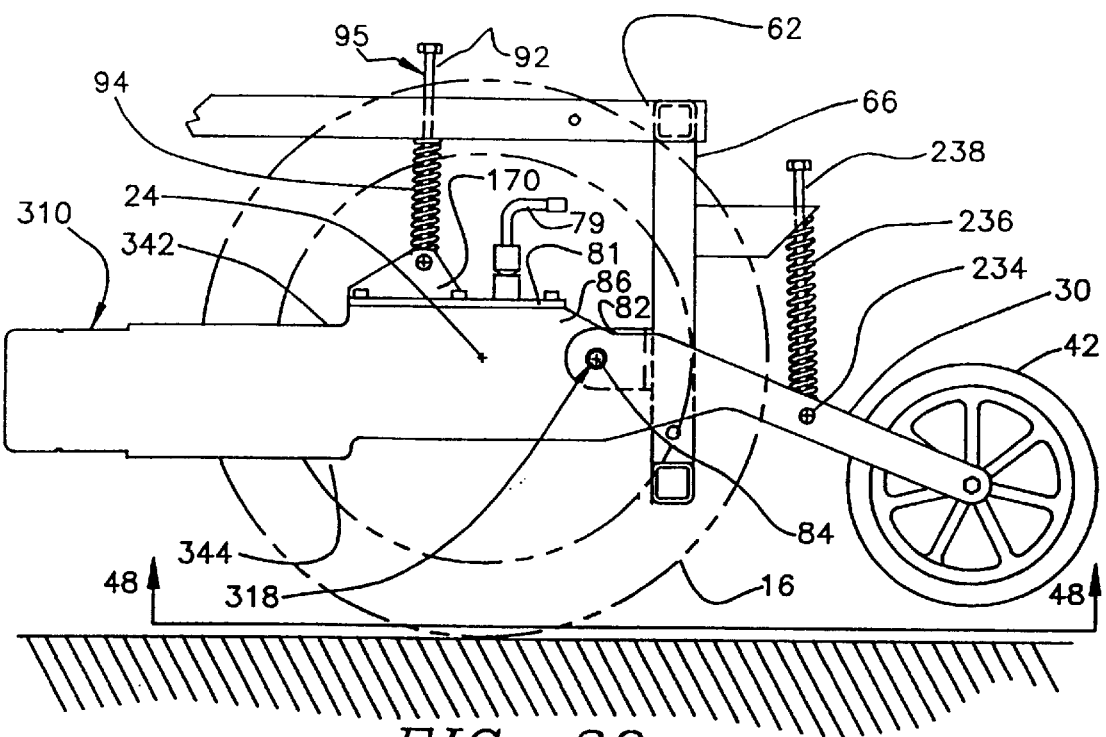
FIG. 28 is a broken schematic side view of a preferred embodiment of suspension apparatus for the curb-climbing power wheelchair drive wheels and forward anti-tip wheels which is to be considered to be taken at arrows 9—9 in FIG. 4 for reference with the drive wheel shown in phantom similarly to FIG. 9, illustrating certain aspects of the invention.

As illustrated in FIGS. 28 trough 36 in the preferred embodiment, the drive wheel/motor transmission combination housing defines a portion of a suspension member designated generally 310 which connects with frame 12 at a pivot connection denoted 318 in FIGS. 28 through 36. Hence, each drive wheel 16 is free to move respecting frame 12 upon encountering an obstacle without the remaining drive wheel 16 moving respecting frame 12. There is no common axle for the two drive wheels 16.

Each drive wheel/motor/transmission combination suspension member 310 is independently suspended respecting frame 12. Frame 12 includes eye portions 82 which are fixedly connected, preferably by welding, to forward vertical members 66 of frame 12 as illustrated in FIGS. 7 and 28 through 36. Eye portions 82 have apertures 84 formed therein. As illustrated in FIGS. 7 and 28 through 36, eye portions 82 preferably include two parallel, transversely spaced-apart rearwardly facing longitudinally elongated plates 348 having apertures 84 which are transversely aligned therein. Eye portions 82 are preferably generally of U-shape configuration with plates 348 visible in FIGS. 7 and 36 forming the legs of the U and the base of the U being welded to the rearwardly facing surface of an upstanding frame member 66.

As shown in FIG. 4, transmission 78 is preferably a right angle worm drive serving to change the axis about which driving rotation is provided by motor 76. Specifically, motor 76 is preferably positioned so that the motor output shaft extends generally longitudinally. Associated transmission 78 through the right angle worm drive provides driving rotation output via an axle, which is not numbered in the drawings but is journaled in housing 80, drivingly connected to a drive wheel 16.

A shift lever 79 extending out of transmission 78 may be manually rotated to disengage transmission 78 thereby providing free wheel operation of an associated drive wheel 16. When body 34 (FIG. 1) is in place on frame 12, shift levers 79 protrude through apertures in body 34, permitting facile switchover from driven to freewheeling operation of an associated drive wheel 16 by the wheelchair operator merely manually turning the associated shift lever 79.

Motor 76 and transmission 78 are preferably rigidly connected together and are preferably maintained within a rigid preferably one-piece motor/transmission housing 80. The cover 81 of motor transmission housing 80 is preferably glass filled nylon, which is extremely strong and provides extremely quite operation. Housing 80 includes an ear portion 86 extending forwardly therefrom as illustrated in FIGS. 28 through 36.

Ear portions 86 preferably include apertures 88 sized and positioned to be congruent with apertures 84 illustrated in FIG. 7, so that apertures 84, 88 may be aligned. A pivot pin 90, illustrated in FIG. 36, fits within aligned apertures 84, 88 and permits rotation of housing 80, and hence motor 76 and transmission 78 housed therewithin, relative to frame 14 responsively to acceleration or deceleration of associated drive wheel 16.

Further preferably forming a part of the drive wheel independent suspension apparatus is a shaft-spring combination, which combination has been designated 95 in FIGS. 28 through 35. Shaft 92 of shaft-spring combination 95 is preferably pivotally affixed to a web 170 which is preferably formed integrally as a part of the glass filled nylon cover 81 of motor/transmission housing 80. Most preferably two parallel webs 170 are provided as a part of glass filled nylon cover 81 of housing 80, which webs 170 are longitudinally commonly positioned and transversely aligned such that only a single web 170 is visible in FIGS. 28 through 35; the second, remaining web is immediately behind the visible web 170, is transversely spaced therefrom and is a part of the same cover 81 of motor/transmission housing 80.

Further desirably, pivotal connection of shaft 92 to web 170 is provided by means of a transversely extending shaft, not numbered but illustrated in FIGS. 28 through 35, which extends between web 170 and the web which is hidden from view, and is pivotally mounted in both of these webs for freely rotatable motion respecting each of these webs. Shaft 92 is preferably secured to a member which fits rotatably on the unnumbered transverse shaft extending between web 170 and the unnumbered web hidden from view. Shaft 92 extends preferably upwardly from connection with web 170 through an aperture formed in upper longitudinally extending member 62 of frame 14.

A coil spring 94 is wrapped around shaft 92 and at one end preferably abuts web 170. Alternatively the lower end of spring 94 may be fixedly connected to shaft 92 or to a sleeve fitted about the unnumbered shaft which extends transversely between web 170 and the web which is hidden from view in FIGS. 28 through 35. Spring 94 at its upper end fits into a spring pivot member 380, illustrated in FIGS. 38 through 42, which is rotatably retained within longitudinally extending member 62 by a pair of shoulder bolts 382, illustrated in FIG. 42.

Figure 29:
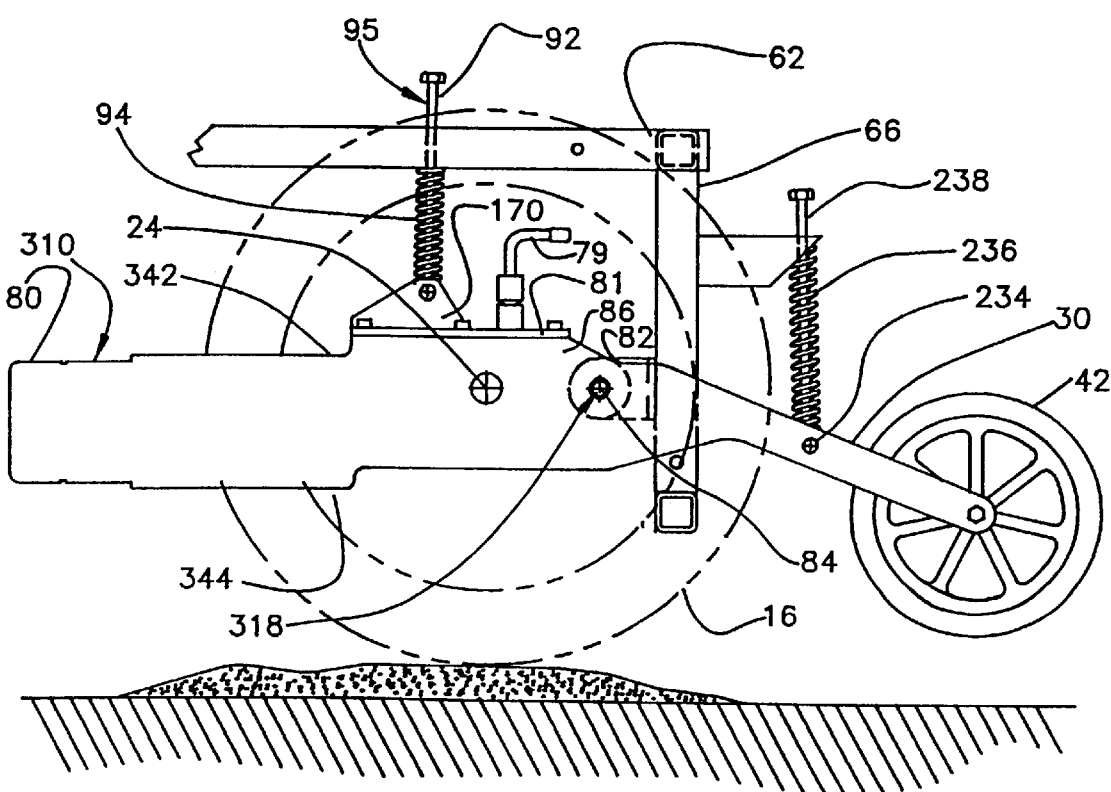
FIG. 29 is a broken schematic side view of the preferred embodiment of suspension apparatus for the curb-climbing power wheelchair drive wheels and forward anti-tip wheels similar to FIG. 29 with the drive wheel illustrated traversing a small bump.
Figure 31:
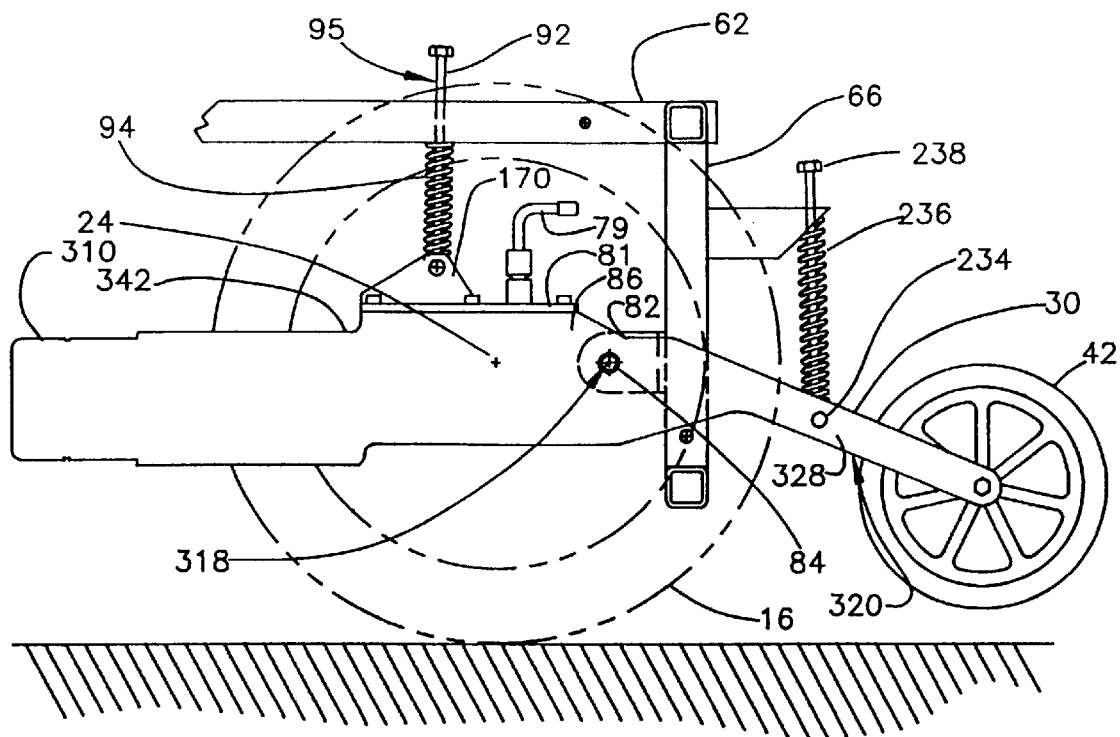
FIG. 31 is a view identical to FIG. 28 and is presented for contrast with FIG. 30.

When a drive wheel 16 encounters an obstacle as illustrated in FIG. 29 and moves upwardly, housing 80 pivots in a clockwise direction about pin 90. This upward pivotal movement of housing 80 compresses spring 94 as web 170 moves upwardly thereby reducing distance from web 170 to the lower surface of longitudinally extending member 62. Spring 94, being compressed, exerts downward force on web 170 and hence on housing 80. This force urges housing 80 to rotate counter-clockwise about pivot pin 90 as drive wheel 16 passes over the obstacle and moves downwardly.

When a drive wheel 16 accelerates, the drive wheel motor/transmission combination suspension member 310 attempts to rotate about pivot pin 90 in a counter-clockwise direction in reaction to acceleration of the drive wheel. The counter-clockwise rotation lifts anti-tip wheels 42 further off the ground.

Shaft 92 is preferably slidably retained within spring pivot member 380 in longitudinally extending tubular member 62. Sliding passage of shaft 92 through spring pivot member 380 connected to longitudinal tubular member 62 permits shift 92 to rise in response to an associated drive wheel encountering an obstacle such as illustrated in FIG. 29 or to effectively rise as the motor/transmission combination suspension member 310 rotates clockwise about pivot point 318 in reaction to deceleration of an associated drive wheel 16. A clearance aperture cut in the upper wall of longitudinally extending member 62, immediately above shaft 92, permits upward movement of shaft 92 without shaft 92 interfering with frame 12 or with longitudinally extending member 62.

As shown in FIG. 1, curb-climbing power wheelchair 10 further preferably includes a body 34 which not only provides a decorative, aesthetically pleasing appearance for curb-climbing power wheelchair 10 but also protects the wheelchair user from batteries 32 and from the electrical connections between batteries 32 and motor 76. Body 34 further provides protection for batteries 32 and, to some extent motors 76 and transmissions 78 within housings 80, from liquids.

Figure 6:
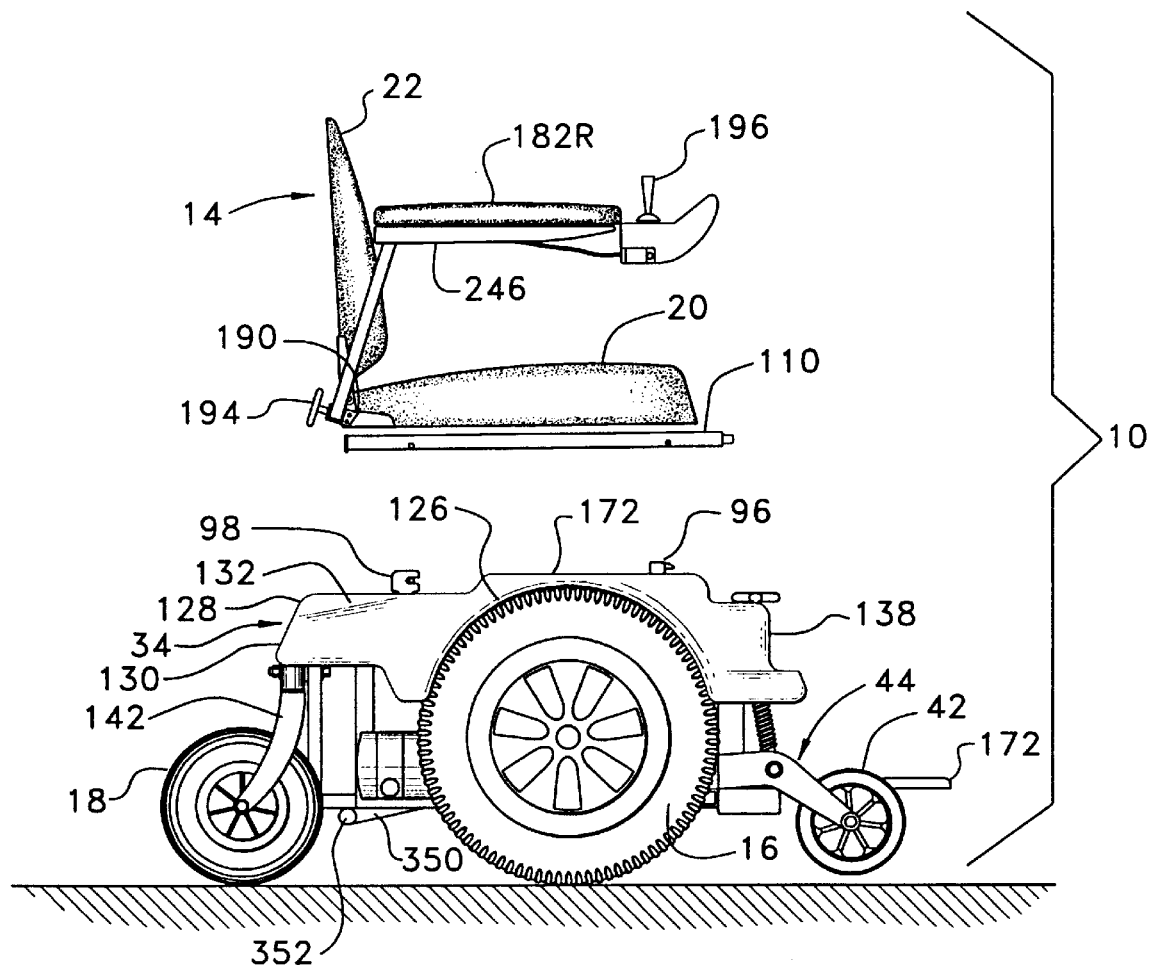
FIG. 6 is a partially exploded side view of the power wheelchair illustrated in FIGS. 2 through 5 taken looking in the same direction as FIG. 5, with the batteries and wheelchair body in position and supported by the wheelchair frame and with the wheelchair seat illustratively removed from the frame and above the frame/body assembly, illustrating certain aspects of the invention.

Body 34 preferably includes a central generally planar portion 173 which, when body 34 is in place on frame 12, overlies batteries 32 as illustrated in FIG. 5 and 6 and, to a lesser extent, in FIG. 1.

As illustrated in FIGS. 1, 5 and 6, body 34 preferably further includes fender portions 126 which preferably substantially wrap around upper semi-circular portions of respective drive wheels 16. Fenders 126 preferably extend outwardly preferably over at least major portions of the width of associated drive wheels 16, to fit closely about the drive wheel portions which are enveloped by respective fenders 126.

Body 34 may farther include a rearwardly facing openable bonnet portion (not shown). There may be further provided as a portion of body 34 a planar portion extending downwardly from the openable bonnet for preferably at least substantially concealing the rear suspension of wheelchair 10, especially transverse beam 38 from which rear idler wheels 18 are suspended.

As illustrated in FIGS. 1, 5 and 6 body 34 preferably further has rear corner portions 132 which are preferably rounded and also extend over the suspension gear for rear idler wheels 18, specifically transverse beam 38 and U-shaped spindles 142. Rounded rear corners 132 and fender portions 126 preferably transition to central planar portion 173 via at least partially concave transition portions 134 which have apertures for passage therethrough of upstanding front and rear seat support members 96, 98 and additional apertures for passage therethrough of shift levers 79 (not shown).

As illustrated in FIG. 1, body 34 preferably yet further includes, and has formed therein, a pair of forwardly facing integral bumper members 138 lying over and protecting forward suspension members such as spindle flanges 320 which form a part of pivotally connected suspension member 310 which is illustrated in FIGS. 28 through 37 but is not present in the version of the power wheelchair illustrated in FIG. 1, where a wishbone is used to suspend the forward anti-tip wheel. Forwardly facing integral bumper members 138 serve to protect suspension parts such as spindle flange 320 and associated spring-strut combinations, which resist and cushion arcuate upward movement of forward anti-tip wheels 42 in spindle flanges 320 relative to frame 12 as suspension member 310 pivotally rotates about pivot connection 318. This is as illustrated in FIGS. 28 through 35 where the suspension and the spring-strut structure is shown.

Figure 27:
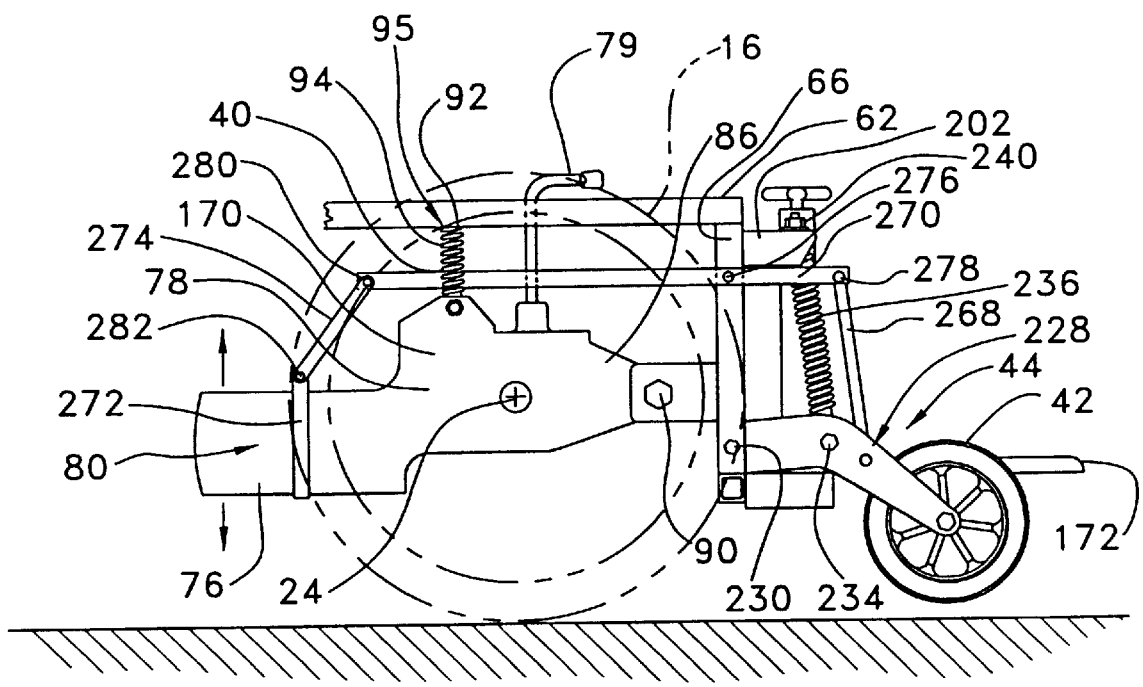
FIG. 27 is a broken schematic side view of an alternate embodiment of suspension apparatus for the power wheelchair drive wheels and forward anti-tip wheels which is to be considered to be taken at arrows 9—9 in FIG. 4 for reference with the drive wheel shown in phantom similarly to FIG. 9, illustrating certain aspects of the invention.

When the alternate suspension structure illustrated in FIG. 27 is used, the forwardly facing integral bumper members 138 lie over and protect the spring-strut-beam combinations designated generally 44 which govern arcuate movement of forward anti-tip wheels 42 relative to frame 12.

Body 34 preferably further includes a planar portion extending between forward bumper members 138 where such planar portion is designated 136 and provides a kick panel for the power wheelchair occupant. The kick panel is designated 136 and is illustrated in FIG. 1.

Body 34 preferably rests directly on frame 12. Body 34 is preferably a single molded piece of high impact plastic and is exceedingly light. Body 34 may be manually directly lifted off of frame 12 once seat 14 has been removed, without use of tools. Because body 34 fits closely about frame 12 and is effectively contoured to the shape of frame 12 and the associated members by which the rear idler wheels 18, the forward anti-tip wheels 42 and the other structure are connected directly or indirectly to frame 12, body 34 need not be fixed to frame 12. The power wheelchair 10 operates well with body 34 resting on but not secured to frame 12.

Body 34 may be retained in place on frame 12 by mating pads of respective hook and eye material (not shown), such as that sold under the trademark Velcro, affixed to upwardly facing surfaces of longitudinally extending tubular member 62, preferably at the forward extremities thereof. Corresponding mating pieces of Velcro are affixed to the undersurface of body 34 at planar portions thereof which rest directly on the forward extremities of longitudinally extending tubular members 62. Use of the hook and eye material attachments minimizes any rattles which might otherwise occur as body 34 moves slightly relatively to frame 12 during operation of power wheelchair 10.

FIG. 8 illustrates structure providing means for adjustably transversely separatingly positioning arms of seat 14 where the arms are designated generally 182 with the left (looking forward) arm designated 182L and the right (looking forward) arm designated 182R. The structure facilitating adjustable transverse separation and positioning of arms 182L, 182R includes an arm support base 184 which is preferably a hollow rectangular cross-section tubular member. Arm support base 184 is connected to seat 14, specifically to cushion portion 20 thereof, indirectly Arm support base 184 directly connects to rearwardly facing portions of L-shaped brackets 222, the lateral portion of one of which is visible in FIGS. 13 through 16 and is partially visible in FIG. 8. The portion of L-shaped bracket 222, which faces rearwardly and is preferably in facing contact with a rearwardly facing surface of cushion portion 20 of seat 14, is not visible in FIG. 8; it is hidden behind the hollow rectangular cross-section tubular member defining arm support base 184. Lateral portions of L-shaped brackets 222 are connected to laterally facing, flange surfaces of cushion support brackets 224 which are secured to cushion portion 20 of seat 14 and are illustrated in FIGS. 13 through 16. Preferably L-shaped brackets 222 are secured to laterally facing flange surfaces of cushion support brackets 224 via a pair of Phillips head screws as illustrated in FIGS. 13 through 16 but not numbered to aid clarity of the drawings.

Cushion support brackets 224 preferably include upstanding flange portions, which run along the longitudinally extending side of seat cushion 20, and bottom portions which run longitudinally along the bottom of seat cushion 20. Cushion support brackets 224 are preferably secured to cushion portion 20 of seat 14 via screw-type fasteners driven into the bottom of seat cushion portion 20 through apertures in bottom longitudinally extending portions of cushion support brackets 224.

A seat back support bracket 226 illustrated in FIG. 8 and FIGS. 13 through 16 is of generally L-shaped transverse cross-section and includes a rearwardly facing flange portion and a side facing flange portion. The rearwardly facing flange portion has apertures for screw-type fasteners to pass therethrough and into the rearwardly facing surface of seat back 22, to secure seat back 22 to the associated seat back support bracket 226.

Seat back support brackets 226 are preferably connected to seat cushion support brackets 224 via a single pivot rivet connection at each side of seat cushion 20 and seat back 22; the single pivot rivet connection is partially visible in FIGS.

13 through 16. The single pivot rivet connection is partially hidden by a portion of the arm support structure, specifically a vertically extending arm support member 190 in FIGS. 13 through 16. The single rivet connection between seat back support brackets 226 and seat cushion support brackets 224 facilitates folding or pivoting movement of seat back 22 towards seat cushion 20 about the points of single pivot rivet connection between cushion support brackets 224 and seat back support brackets 226.

Arm support extensions are designated generally 186 in FIG. 8 and include horizontal supports 188 and vertically extending supports 190. Arm cushions 192 are pivotally connected, as indicated by 252 in FIGS. 24 and 25, to vertical supports 190 for arcuate motion of arm cushions 192 with respect thereto.

Arm support base 184 includes a pair of tapped holes, not illustrated in FIG. 8, which receive complementary threaded shafts (not shown) fixed to hand knobs 194, illustrated in FIG. 8. The threaded shafts affixed to knobs 194, when advanced or retracted by rotation of knobs 194, through complemental engagement of the threaded shafts with tapped holes in arm support base 184, move against or retract from contact with respective horizontal arm support portions 188 of arm support extensions designated generally 186, which are associated with left and right arms 182L, 182R.

Frictional contact between the threaded shafts fixed to knobs 194 and respective horizontal arm support portions 188 fixes arm support extensions 186 in position when the threaded shafts are tightly turned thereagainst. Fixation of arm support extensions 186 in position fixes the lateral position of arms 182L, 182R. Since horizontal arm support portions 188 are laterally movable into and out of arm support base 184, arms 182L, 182R and arm cushions 192 may be manually moved between the positions illustrated in solid lines in FIG. 8 and the positions illustrated in dotted lines in FIG. 8, thereby adjusting effective width of seat 14 of power wheelchair 10.

Knobs 194 are rotated by application of manual force thereto. Once the knobs are turned to a position at which threaded shafts associated therewith only lightly contact or are removed from contact with horizontal arm support portions 188, these horizontal arm support portions may be moved by hand, to adjust transverse separation of arm cushions 192 and hence the effective width of seat 14, all without use of tools.

Forward anti-tip wheels 42 do not normally contact the ground or other reasonably smooth surface on which curb-climbing power wheelchair 10 operates. Anti-tip wheels 42 are maintained above the ground and provide protection against tipping in the event of forward pitching of wheelchair 10 due to encounter with arm obstacle, traverse of a significant downgrade, and the like. The off-the-ground, anti-tip positioning of wheels 42 is illustrated in FIGS. 1, 2, 5, 6, 9 through 11 and 27 through 29.

In FIGS. 28 through 36, a suspension member is designated generally 310 and shown schematically. The portion of housing 80 in which motor 76 resides, as shown in more detail in FIG. 37, forms the rear of suspension member 310 (the left hand end viewing FIGS. 28 trough 36). Suspension member 310 has a central portion 314 and a spindle flange 320 which defines the forward portion of suspension member 310, as illustrated in FIGS. 28 through 36. Suspension member 310 is connected to frame 12 at pivotal connection 318 via pin 90 passing through aperture 84 of frame eye 82.

One suspension member 310 is located on either side of the power wheelchair 10. Each suspension member 310 houses a motor 76, which is one of the pair of motors, with one motor 76 driving each drive wheel 16. Suspension member 310 additionally houses transmission means 78 for transmitting torque from the associated motor 76 to an axle of the associated drive wheel 16. The associated drive wheel is journaled in suitable bearings within the front of motor/transmission housing 80 which forms the central portion of suspension member 310. The axis of rotation of the drive wheel 16 is indicated as 24 in FIG. 28.

Figure 36:
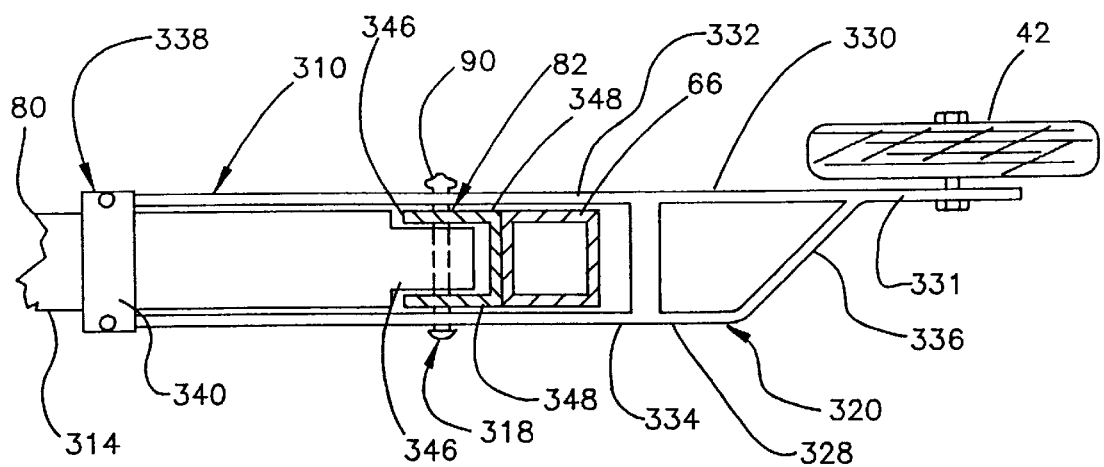
FIG. 36 is a partially sectioned broken plan view, taken along arrows 36—36 in FIG. 28, of the preferred embodiment of suspension apparatus for the curb-climbing power wheelchair drive wheels and forward anti-tip wheels shown schematically in FIGS. 28 through 35 formed on the side of the power wheelchair.

Spindle flange 320 of suspension member 310 has a box-like configuration with forwardly extending sides of the box being designated 328, 330 in FIG. 36. Box side 330 is the outboard side of spindle flange 320; as a result of the illustrated geometry of spindle flange 320 and suspension member 310, the associated anti-tip wheel 42 is essentially longitudinally aligned with the associated drive wheel 16 (not shown). This provides enhanced wheelchair stability and also permits a wider footrest 172 (FIG. 1).

Figure 38:
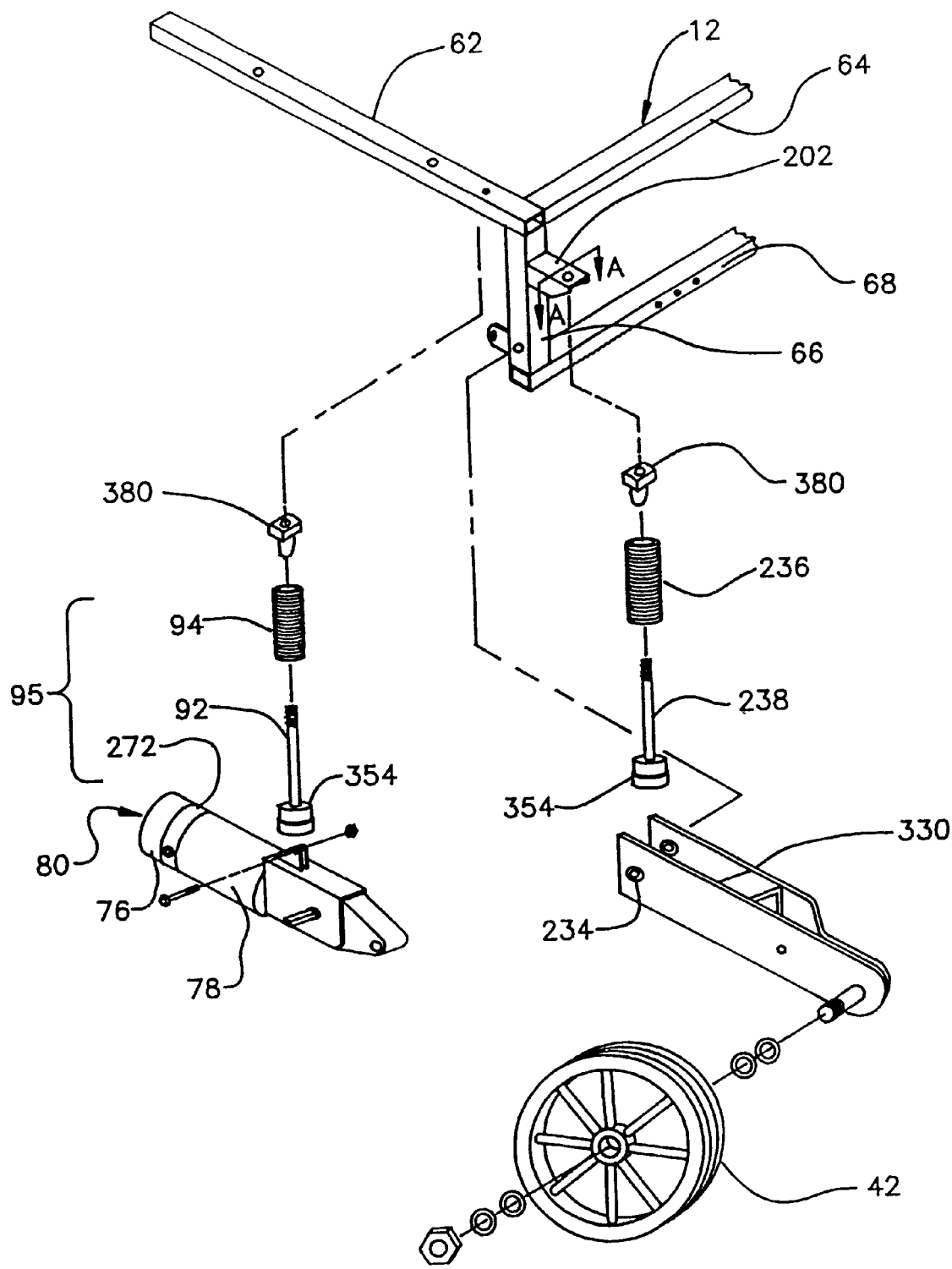
FIG. 38 is an exploded isometric view of portions of the frame and suspension apparatus of the power wheelchair illustrated in FIG. 27
Figure 39:
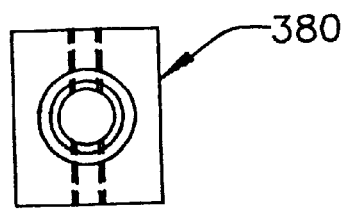
FIG. 39 is a top view of a spring pivot for securing cylindrical spring support bases and upstanding shafts.
Figure 40:
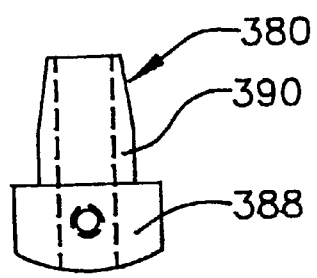
FIG. 40 is a front view of the spring pivot shown in FIG. 39.
Figure 41:
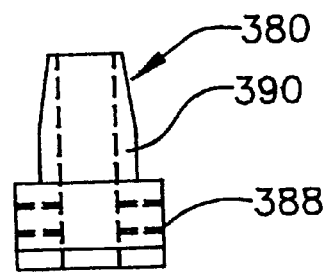
FIG. 41 is a side view of the spring pivot shown in FIG. 40.

Extending between box sides 328, 330 of spindle flange 320 is a shaft 234 (FIG. 28). Mounted on each shaft 234 is a spring support base 354, not visible in FIGS. 28 trough 35 but shown schematically in FIG. 38. Secured to and extending upwardly from spring support base 354 is an upstanding shaft 238, the upper extremity of which extends through and is slidably retained within a spring pivot 380 illustrated in FIGS. 38 through 42. This spring pivot 380 resides within an aperture formed in a horizontally extending planar portion of the forwardly extending pedestal 202 visible in FIGS. 28 through 35. Pedestal 202 extends forwardly from frame member 66. A coil spring 236 is positioned about shaft 238 between spring support base 354 and spring pivot 380, as illustrated in FIGS. 28 through 36, and as best shown in FIG. 38.

Spindle flange 320 further includes a forwardly facing anti-tip arm designated generally 331 in FIGS. 28 through 36 on which forward anti-tip wheel 42 is rotatably mounted.

Figure 37:
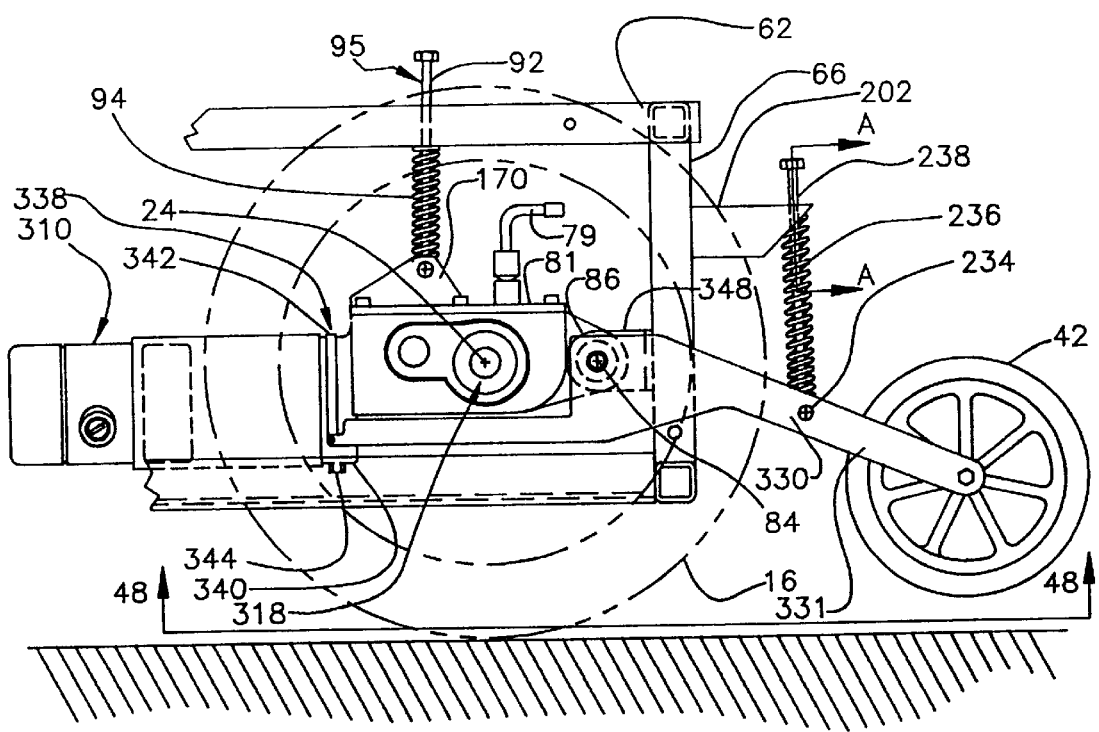
FIG. 37 is a broken schematic side view of the suspension apparatus for the power wheelchair drive wheels and forward anti-tip wheels as illustrated in FIGS. 28 through 35, with the drive wheel illustrated in phantom, illustrating certain structural details.

Spindle flange 320 forms the forward portion of suspension member 310 and is secured about motor/transmission housing 80 by a suitable clamp designated generally 338 in FIGS. 36 and 37. Clamp 338 may be of the type conventionally used to secure mufflers or tailpipes in automobiles and consists of a base plate 340, visible in FIGS. 36 and 37, a hoop member 342 and nuts or other means for retaining hoop member 342 to base plate 340. One such nut is illustrated as 344 in FIG. 37 engaging a threaded extremity of hoop member 342.

The pivotal connection 318 of the suspension member 310, which is defined by motor/transmission housing 80 and spindle-flange 320, with frame 12, is illustrated in FIGS. 28 through 37. The forward portion of motor/transmission housing 80, which may be considered the central portion 314 of suspension member 310, has a narrowed shoulder 346 to fit between two rearwardly extending transversely spaced apart plates designated 348 defining frame eye portion 82 (FIG. 36). Shoulder portion 346 is equipped with suitable bearings; corresponding bores or apertures are formed in plates 348 of eye portion 82 and in outboard 334 and inboard 332 extensions of box sides 328, 330 of spindle flange 320. A suitable pin 90 or nut and bolt combination passes through the aligned apertures in these elements, as illustrated schematically by pivot connection 318 in FIG. 36.

Since spindle flange 320 having forward anti-tip wheel 42 mounted thereon is fixedly connected to motor/transmission housing 80 by clamp 338, and specifically by hoop portion 342 wrapping tightly thereabout, spindle flange 320 and motor/transmission housing 80 move unitarily about pivotal connection 318 responsively to acceleration and deceleration of drive wheel 16, whether due to torque applied by motor 76 or due to wheel 16 encountering an obstacle.

In FIG. 36, forward vertically downwardly extending member 66 has been depicted in section, as has eye portion 82, to aid the clarity of the drawing. The forward portion of motor/transmission housing 80 has not been shaded, to aid the clarity of the drawing.

Pivotal mounting of suspension member 310 to frame 12 via pivotal connection 318 at frame eye 82 facilitates operation of the power wheelchair and particularly facilitates climbing high curbs and descending therefrom. When the power wheelchair accelerates, as torque generated by the drive motors is applied to the associated drive wheels, reaction of suspension member 310 to such acceleration causes suspension member 310 to tend to rotate about pivot connection 318 in a direction opposite that of rotation of the drive wheels 16. For example, in considering FIG. 28, acceleration of drive wheel 16 by the drive motor (not shown) causes drive wheel 16 to rotate clockwise, driving the power wheelchair to the right in FIG. 28. This acceleration of drive wheel 16 causes suspension member 310 to tend to rotate counterclockwise about pivot connection 318, lifting forward anti-tip wheel 42. This rotation of suspension member 310 and consequent lifting of anti-tip wheel 42 facilitates the climbing of obstacles of a height which would otherwise not be surmountable by power wheelchair 10.

When curb-climbing power wheelchair 10 descends from a curb or other elevated area to a lower position, deceleration of drive wheel 16 results in the tendency of suspension member 310 to rotate in the opposite direction, namely clockwise, in drawing FIGS. 28 through 35. For example, considering FIG. 30, as power wheelchair 10 approaches a drop edge 322 of a path 324, the occupant of power wheelchair 10 reduces output torque of the drive motors (not shown) creating a load on drive wheels 16 from the associated drive motors. This tends to decelerate the drive wheels respecting rotation in the direction indicated by arrow AA in FIG. 30. This deceleration of drive wheels 16 causes suspension member 310 to rotate about pivot point 84 in the direction of arrow AA in FIG. 30, causing anti-tip wheel 42 to move downwardly in FIG. 30. As a result, power wheelchair 10 desirably makes contact with lower path 326 prior to drive wheel 16 reaching edge 322 separating raised path 324 from lower path 326. This permits power wheelchair 10 to travel over dropoffs and curbs, such as represented by edge 322, of substantially greater height than otherwise possible.

Figure 30:
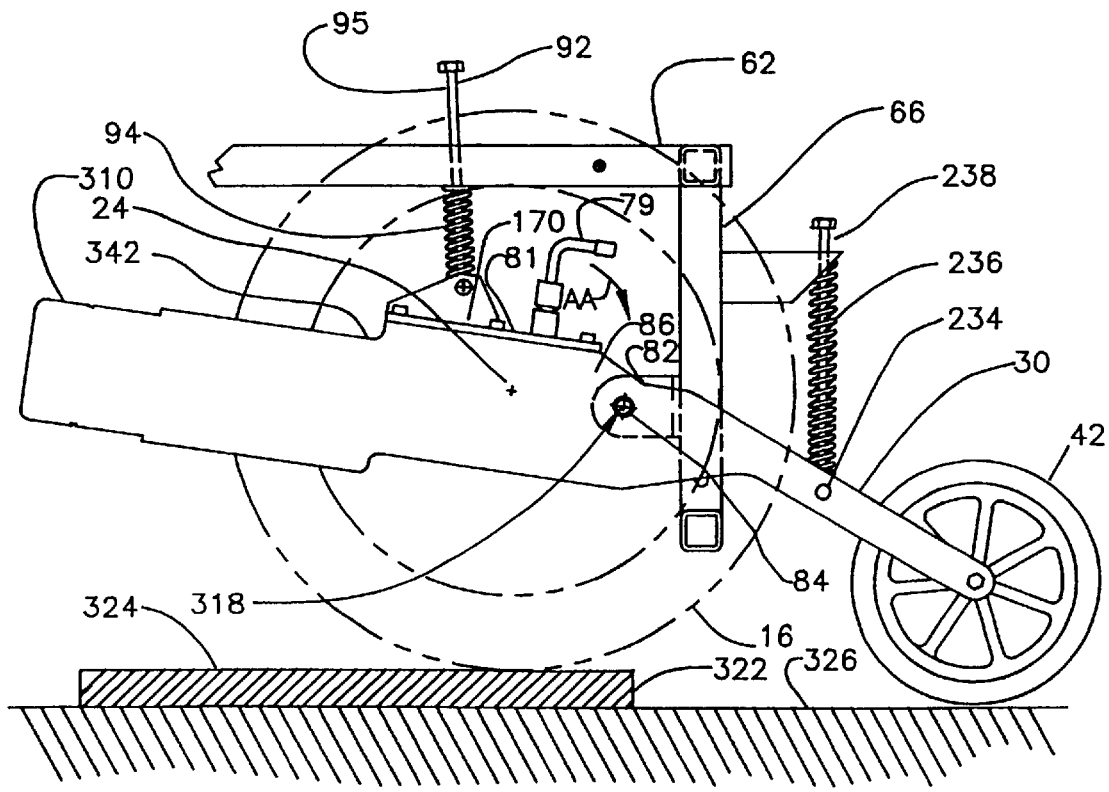
FIG. 30 is a broken schematic side view of the preferred embodiment of suspension apparatus for the curb-climbing power wheelchair drive wheels and forward anti-tip wheels illustrated in FIGS. 28 and 29, with a drive wheel further illustrated on a curb elevated respecting grade.

Springs 94 and 236 are respectively compressed upon clockwise and counterclockwise rotation of suspension member 310 in the orientation illustrated in FIG. 28. Hence, considering movement of power wheelchair 10 to be to the right in FIG. 28, as power wheelchair 10 goes down a slight grade (such as illustrated in FIG. 29) or approaches a vertical dropoff (such as illustrated in FIG. 30), spring 236 urges suspension member 310 to rotate in the clockwise direction illustrated in FIG. 28 thereby urging anti-tip wheel 42 downwardly in order to contact the ground or other running surface along which power wheelchair 10 is moving. This tendency towards clockwise movement or rotation of suspension member 310 is resisted by compression of spring 94. The spring constant of spring 236 is preferably about one hundred ten (110) pounds per inch, while the spring constant of spring 94 is preferably about two hundred eighty-eight (288) pounds per inch. When power wheelchair 10 is at rest, springs 94 and 236 are not compressed and not extended.

Figure 33:
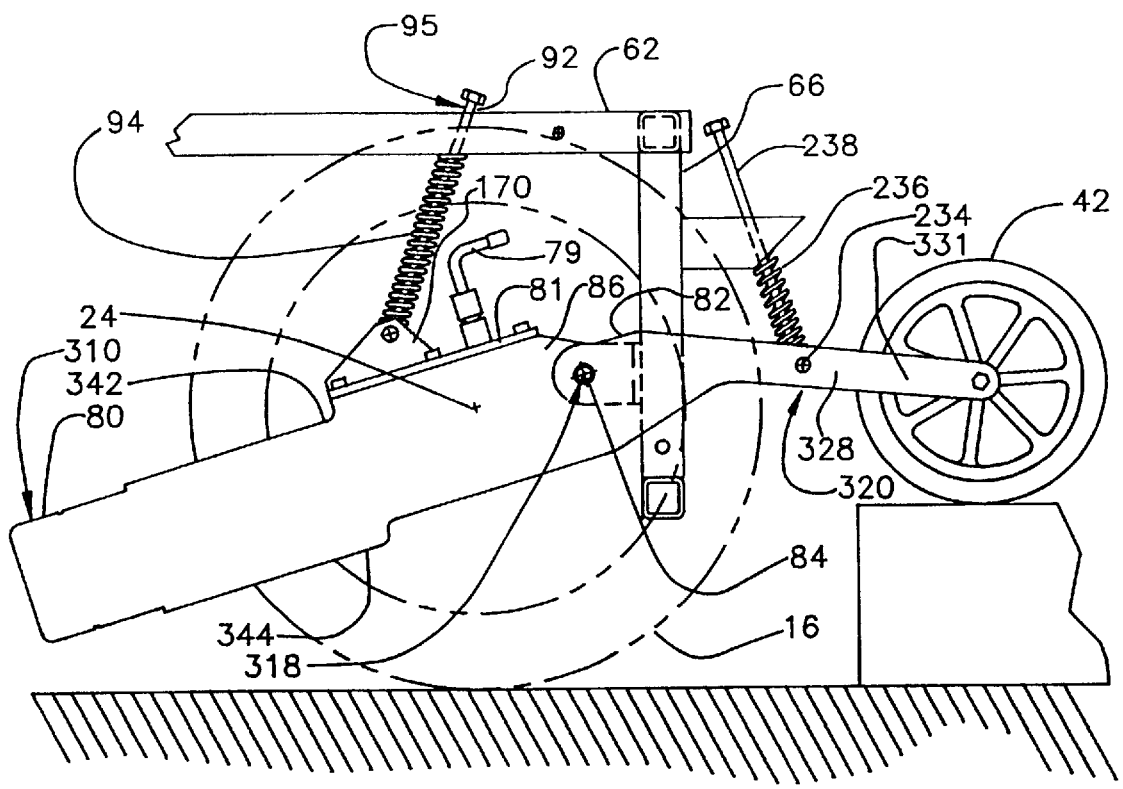
FIG. 33 is a broken schematic side view of the preferred embodiment of suspension apparatus for the curb-climbing power wheelchair drive wheels and forward anti-tip wheels illustrated in FIGS. 28 through 32 with the forward anti-tip wheels shown on the top of the high curb illustrated in FIG. 32.
Figure 32:
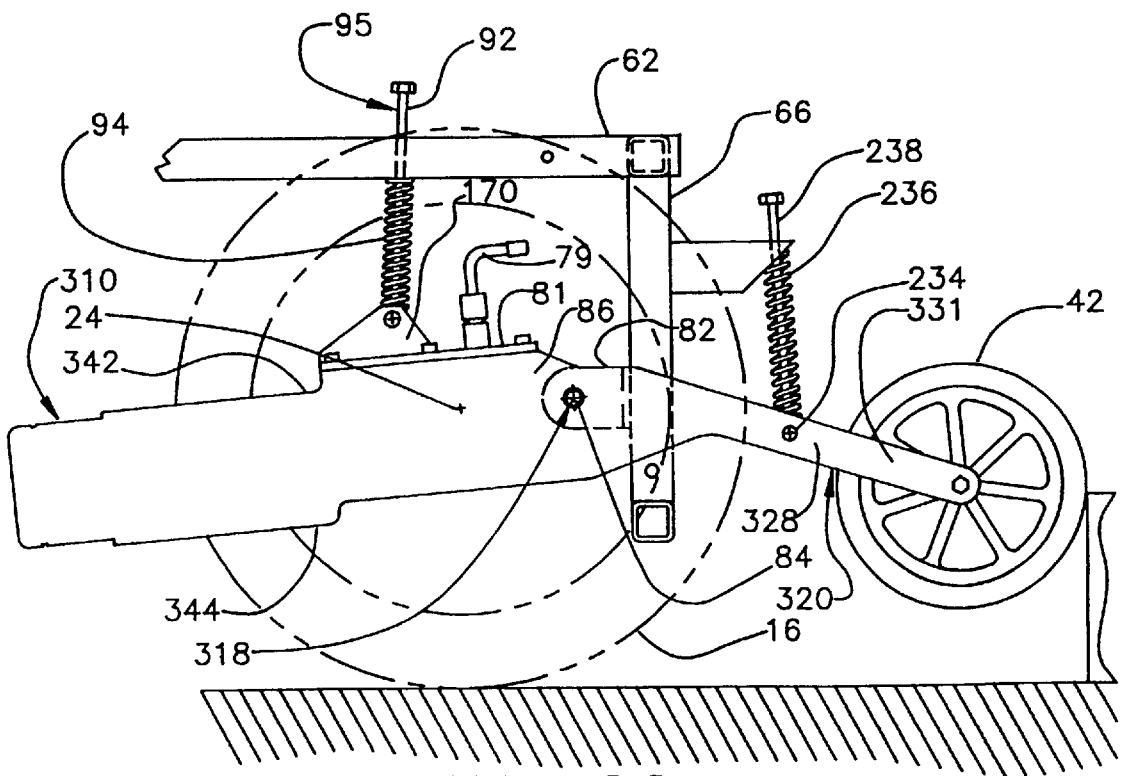
FIG. 32 is a broken schematic side view of the preferred embodiment of suspension apparatus for the curb-climbing power wheelchair drive wheels and forward anti-tip wheels illustrated in FIGS. 28 through 31, with the forward anti-tip wheels shown encountering a vertical edge of a high curb.
Figure 34:
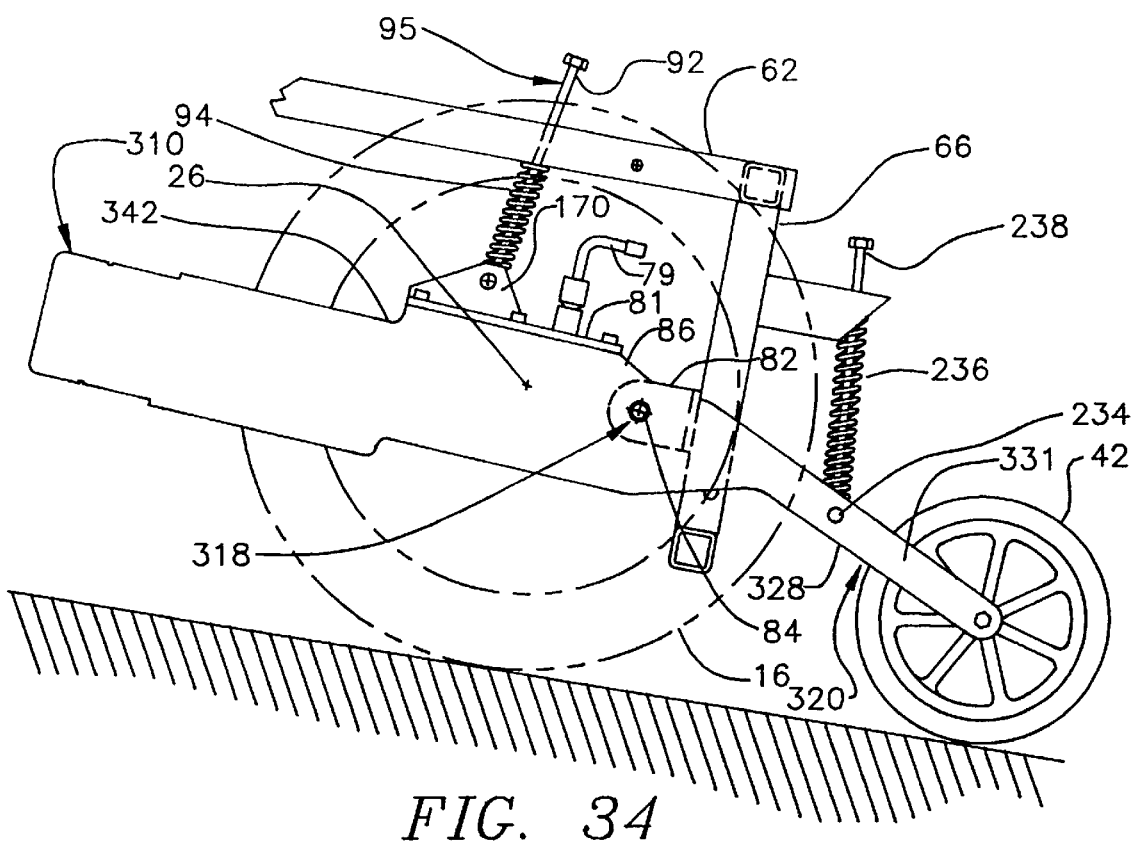
FIG. 34 is a broken schematic side view of the preferred embodiment of suspension apparatus for the curb-climbing power wheelchair drive wheels and forward anti-tip wheels illustrated in FIGS. 28 through 33 with the drive wheels and the forward anti-tip wheels shown on a common downgrade.

When power wheelchair 10 approaches an obstacle of moderate height, such as a curb as illustrated generally in FIGS. 32 and 33, and when tip wheel 42 encounters the obstacle, this in combination with acceleration of drive wheel 16 tends to cause suspension member 310 to rotate in the counterclockwise direction as illustrated in FIGS. 32 and 33. This compresses spring 236, providing a cushioning effect.

As illustrated in FIGS. 2, 5 and 6, power wheelchair 10 may yet further preferably include a generally triangularly-shaped skid 350 mounted on the bottom and at the rear of frame 12. Skid 350 is most preferably mounted on the bottom of and at the rear of horizontal rear extension member 148 which is shown in FIG. 4. Skid 350 is preferably nylon or another preferably polymeric material having good lubricity characteristics. Optionally, skid 350 may be equipped with a skid wheel 352 (FIG. 2) which is preferably mounted on a transverse axle for rotation in a direction generally parallel with drive wheels 16 and is oriented so that the lower extremity surface of skid wheel 352 is essentially at the same position off the ground as the rear, lower extremity of skid 350, as depicted schematically in FIG. 2.

Skid 350 and optional skid wheel 352 serve to facilitate the ascension of power wheelchair 10 over steep curbs of a height such as illustrated in FIGS. 32 and 33. When power wheelchair 10 ascends such a steep curb, after the drive wheel 16 has traveled from the lower grade to the curb, and if the curb is of sufficient height, then the curb can contact the lower portion of frame 12, behind drive wheel 16. Skid 350 and optional skid wheel 352 prevent this and provide for sliding, non-damaging contact between the high curb and the rear portion of the power wheelchair 10, until such time as rear idler wheel 18 can traverse up the curb thereby preventing hang-up of the rear castors.

A principal advantage of the power wheelchair is provided by the spring-loaded anti-tip forward wheels 42 located in front of each drive wheel 16. Spring-loading of wheels 42 allows power wheelchair 10 to be driven over obstacles and over inclined transitions without fear of drive wheel 16 lifting, thereby breaking traction and causing stoppage of forward motion of wheelchair 10.

When attempting to climb obstacles such as ramp transitions or small curbs, acceleration of motor 76 transmitted to drive wheels 16 tends to cause the rear of motor 76 within housing 80 to drop; this creates an upward force on anti-tip wheels 42. This helps anti-tip wheels 42 climb the obstacle encountered by wheelchair 10. Additionally, in situations involving ramp transition, and as the driving surface rises and contacts the anti-tip wheels 42 thereby applying upward force on wheels 42, downward force is created at the center portion of suspension member 310, forcing the tires of the drive wheels 16 into the ground, thereby further increasing traction and the chances of the wheelchair overcoming the obstacle.

In a deceleration situation, such as when reducing speed going down a ramp, the opposite effect is used advantageously. As the rear of suspension member 310 rises during deceleration, this exerts downward force on anti-tip wheels 42 which effectively increases the anti-tip force provided by spring 236.

High maneuverability of the power wheelchair is achieved by locating drive wheels 16 close to the longitudinal center of the power wheelchair.

As shown, for example, in FIG. 28, longitudinal distance between the center of aperture 84 in eye 82 and the drive axle for the associated drive wheel, where the drive axle emerges from suspension member 310 to drive associated drive wheel 16, is preferably in the neighborhood of from two and three quarters (2 and ¾) to three (3) inches, measured longitudinally.

Longitudinal distance between pivotal connection 318 and shaft 234 defining the point of application of downward bias of spring 236 to suspension member 310 is preferably about 5 and 63/100 inches. This pivotal connection of suspension member 310 to frame 12 via eye 82 provides the active independent suspension system for the combination of suspension member 310, anti-tip wheel 42 and associated drive wheel 16.

Figure 35:
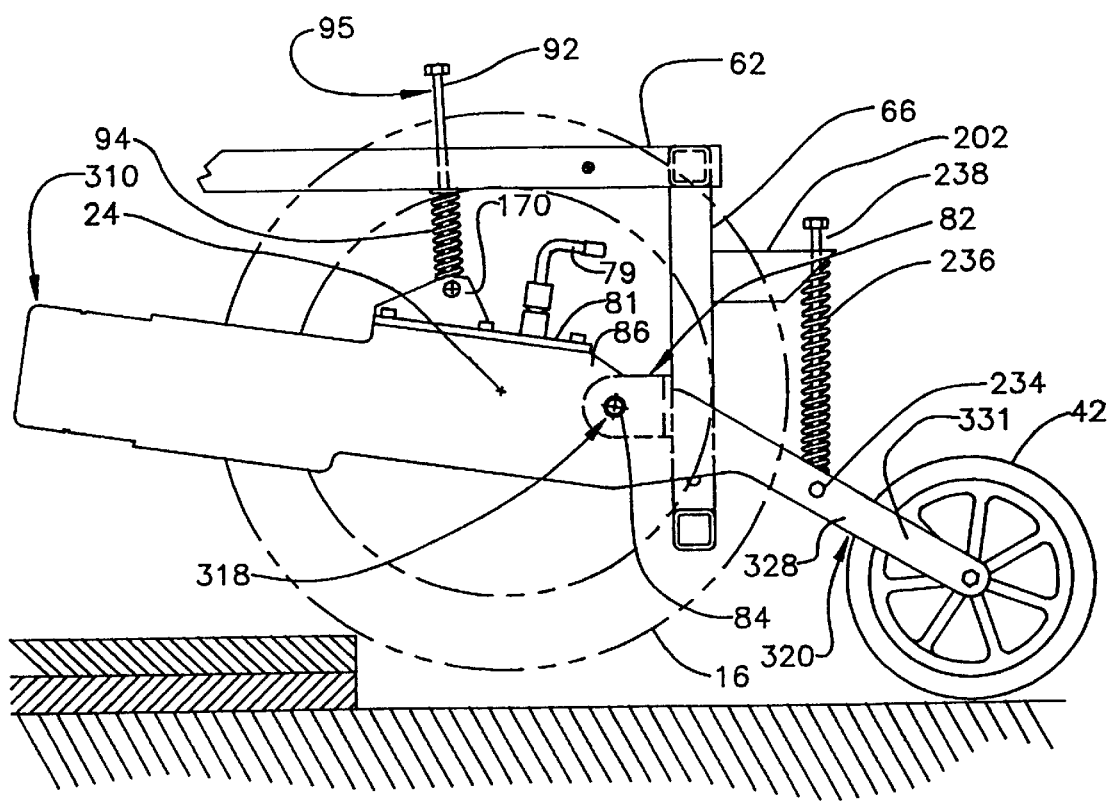
FIG. 35 is a broken schematic side view of the preferred embodiment of suspension apparatus for the curb-climbing power wheelchair drive wheels and forward anti-tip wheels illustrated in FIGS. 28 through 34 showing the drive wheels descending from a curb with the forward anti-tip wheels contacting grade.

In FIG. 35, depicting a power wheelchair descending from a curb, at the position illustrated both springs 94 and 236 exert downward bias on suspension member 310 thereby cushioning the power wheelchair just as drive wheel 16 contacts the lower level. Spring 94 is compressed due to deceleration of drive wheel 16 and the resultant tendency of suspension member 310 to rotate clockwise, as in FIG. 35; spring 236 is compressed as a result of anti-tip wheel 42 contacting the lower level before drive wheel 16.

As shown in FIG. 35, distance between the point of attachment of shaft 92 with suspension member 310 and drive wheel axis of rotation 24 is substantially less than distance between the point of attachment of shaft 234 to spindle portion 320 and pivotal connection 318 of suspension member 310 with frame eye 82. In situations such as depicted in FIG. 35, spring 236 urges suspension member 310 to rotate in a clockwise direction (as viewed in FIG. 35), causing anti-tip wheel 42 to drop towards the lower surface, mining forward tip of the power wheelchair when descending curbs.

In the embodiment illustrated in FIG. 27, anti-tip idler wheels 42 are connected directly to frame 12 via U-shaped spindles 228; one leg (of the U-shape) of one of spindles 228 is shown in side view in FIG. 27. The U-shape of spindles 228 is readily apparent from FIG. 4.

U-shaped spindles 228 are preferably fabricated by welding rectangular cross-section tubular stock between two parallel plates with the tubular stock forming the base of the U. Spindles 228 are pivotally connected directly to downwardly extending members 66 of frame 12, preferably using screw-bolt assemblies. The side plate portions of spindles 228 fit pivotally on either side about the lower portions of respective downwardly extending vertical tubular members 66, which are illustrated in FIG. 7 Nut and bolt pivotal connections of U-shaped spindles 228 to vertically downwardly extending members 66 are depicted schematically by indicator numeral 230 in FIG. 27.

Extending upwardly between the legs of U-shaped spindles 229 are shafts (not shown) about which springs 236 reside. These shafts are mounted on spring support bases 354, in the same manner as illustrated in FIG. 38. The upper extremities of the shafts extend through and are slidably retained within spring pivots 380, in the same manner as illustrated in FIG. 38, residing in horizontally extending planar portions of forwardly extending pedestals 202, which are visible in FIG. 7 as well as in FIG. 27.

With this arrangement, upon an anti-tip wheel 42 encountering an obstacle or upon wheelchair 10 pitching forwardly, anti-tip wheels 42 move arcuately, together with U-shaped spindle 228, as they pivot about pivotal connection 230 relative to frame 12. As the illustrated anti-tip wheel 42 and U-shaped spindle 228 pivot about connection point 230, upward movement of spindle 228 causes distance between shaft 234 and pedestal 202 to decrease, thereby compressing spring 236, as illustrated in FIG. 27.

As shown in FIGS. 39 through 42, spring pivot 380 has a head portion 388 and a tapered sleeve portion 390 that are rigidly connected. As shown in FIGS. 37 and 38, an upstanding shaft 238, which is secured to and extends from the cylindrical spring support base 354, fits inside tapered sleeve portion 390 (not shown in FIGS. 37 and 38) of the spring pivot 380.

Figure 42:
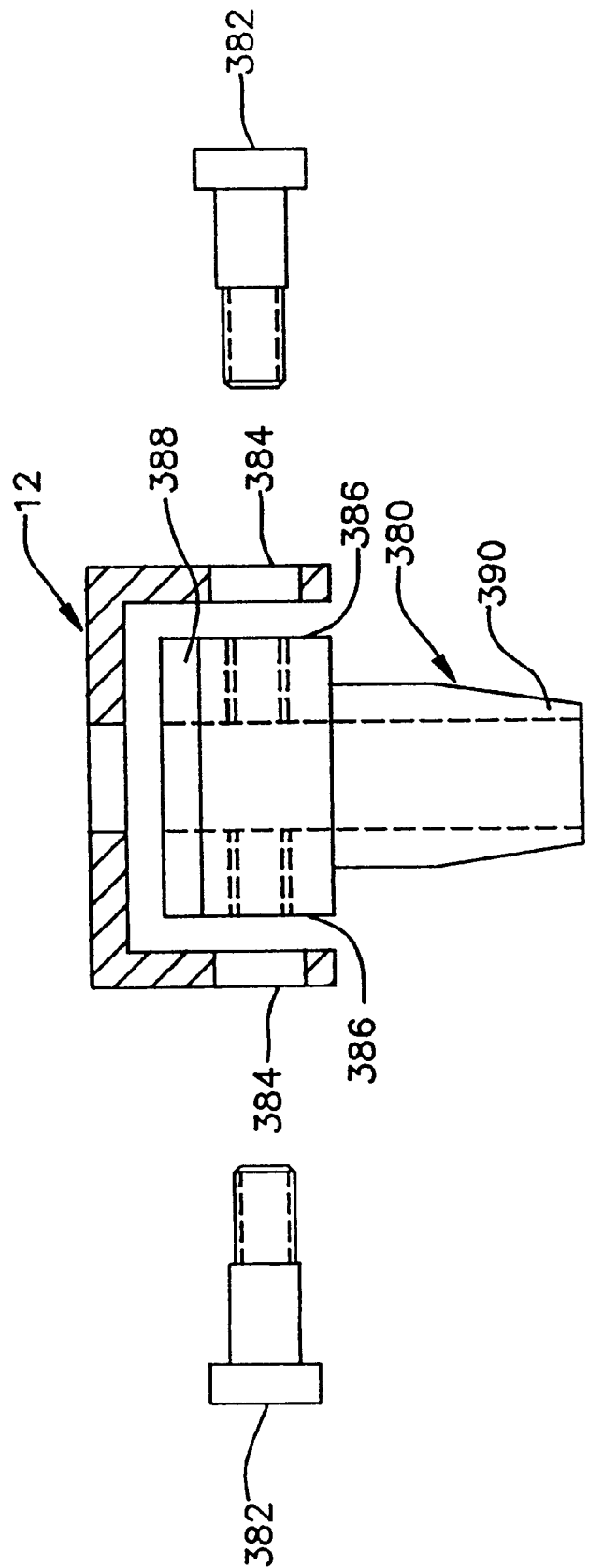
FIG. 42 is a sectional side view of the spring pivot and shoulder bolts, in position within the pedestal, taken along line A—A in FIG. 37, for securing cylindrical spring support bases and upstanding shafts.

As shown in FIG. 42, upstanding shaft 238, spring 236, and spring pivot 380 are held together by shoulder bolts 382 which pass through apertures 384 in the relevant frame member and threaded apertures 386 in the head of spring pivot 380. Shoulder bolts 382 allow the spring 236 and upstanding shaft 238 to pivot on the shoulder bolts 382 of the spring pivot 380 when the spring 236 is compressed.

In the embodiment illustrated in FIG. 27, as the anti-tip wheels 42 encounter an obstacle, spring 236 is compressed upward and the upstanding shaft 288 (not shown) pivots on spring pivot 380 mounted to pedestal 202 of frame 12. Therefore, spring pivot 380 allows upstanding shaft 238 and spring 236 to pivot on shoulder bolts 382 as spring 236 is compressed when anti-tip wheels 42 of the power wheelchair contact an obstacle on the ground.

Compression of spring 236 provides a cushioning effect when anti-tip wheels 42 contact an obstacle or contact the ground due to forward pitching of curb-climbing power wheelchair 10. The suspension of anti-tip wheels 42 provided by spindle 228, connects anti-tip idler wheels 42 to frame 16 for arcuate upward motion relative to frame 12 upon forward tipping of power wheelchair 10 or contact of anti-tip wheels 42 with an above-grade obstacle, as illustrated in FIG. 33.

As shown in FIG. 27, a nut 240 mounted on a threaded portion of the shaft 238 extending above pedestal 202 permits selectable compression of spring 236 thereby providing adjustment of the spring force applied to anti-tip wheels 42 to resist arcuate upward movement thereof upon forward tipping of power wheelchair 10 or upon wheels 42 encountering an obstacle. Rotation of nut 240 also adjusts the distance at which wheels 42 are from the ground.

In this embodiment illustrated in FIG. 27, longitudinal distance between pivot 90 defined by the position of aperture 88 in ear 86 of housing 80 and the drive axle (not shown) for the associated drive wheel 16, where the axle emerges from housing 80 to drive associated drive wheel 16, is preferably in the neighborhood of from two and three quarters (2 and ¾) to three (3) inches, measured longitudinally. This pivotal connection of the drive motor/transmission housing 80 to frame 12 via pivotal connection 90 of ear portion 86 with eye portion 82 provides active independent suspension for the combination of motor 76 and transmission 78 in housing 80, and associated drive wheel 16.

Movement of motor 76 and especially pivotal movement of housing 80 relative to frame 12 indirectly controls action of anti-tip wheels 42 in the embodiment illustrated schematically in FIG. 27. A pivoting beam 270 is pivotally connected to forward vertically extending member 66 of frame 12 via a pivotal connection denoted 276 in FIG. 27. At a forward end of pivoting beam 270 a vertical link 268 is pivotally connected thereto at a pivot connection denoted 278. The lower end of vertical link 268 is pivotally connected to spindle 238 via a pivotal connection which has not been numbered in FIG. 27.

At the opposite, rearward end of pivoting beam 270, an intermediate link 274 is pivotally connected thereto via a connection denoted 280 in FIG. 27. At the remaining end of intermediate link 274 there is pivotal connection 282 effectuating connection of intermediate link 274 and motor link 272, which is preferably fixedly connected to housing 80 of motor 76 and transmission 78. The linkage consisting of pivoting bean 270, vertical link 268 and intermediate line 274 transfer motion between the rear end of motor/transmission housing 80 remote from pivot point 90 and forward anti-tip wheels 42, thereby accomplishing indirectly the same action/reaction of these components to drive wheel acceleration/deceleration as accomplished by the direct connection structure illustrated in FIGS. 28 through 37.

With tilt of seat 14 being adjustable in a manner that cushion portion 20 of seat 14 may be level or positioned tilted forward or tilted back, it is desirable to provide adjustment for arm cushion portions 192 of seat 14 so that arm portions 192 may be adjustably positioned, desirably in a level orientation regardless of whether cushion portion 20 of seat 14 is level, tilted forward or tilted back. Structure facilitating adjustment of the position of arm portion 192 and permitting arm portion 192 always to be positioned in a level orientation is illustrated in FIG. 24.

Each arm, generally denoted 182, includes an arm cushion portion 192 which is preferably upholstered to provide cushioning for the arm of the user of power wheelchair 10. Arm cushion portion 192 is mounted on a longitudinally elongated support web 244. Arm cushion portion 192 and longitudinally elongated support web 244 together constitute arm 182 of curb-climbing power wheelchair 10.

Support web 244 has a horizontally oriented central portion 242, on which arm cushion portion 192 is supported, and two vertically extending webs 246, which are visible in FIG. 8. Webs 246 may be of different size and shape with one of webs 246 supporting joystick controller 196 and electronics associated therewith and the remaining web 246 being of more tapered, somewhat truncated shape. Web 246 supporting joystick 196 and the associated electronics is denoted 246J in the drawings (FIG. 24).

Affixed to the lower longitudinal extremity, preferably by welding, of a vertical support portion 190 of arm support extension 186 (FIG. 8) is a mounting block 248, as illustrated in FIGS. 24 and 25. Mounting block 248 preferably has a tapped hole (not shown) therein. Residing within the tapped hole is a bolt 250 threadedly engaging the tapped hole. Bolt 250 can be advanced into or withdrawn from the tapped hole in mounting block 248 to vary length of bolt 250 protruding from mounting block 248.

Arm 192 connects to vertical support portion 190 via a pivotal connection provided by a rivet indicated as 252 in FIGS. 24 and 25.

As shown in FIGS. 24 and 25, vertical webs 246, 246J of longitudinally elongated support web 244 are spaced apart to receive the extremity of arm vertical support portion 190 therebetween. Mounting block 248 is preferably of the same width, measured transversely to the plane of the paper, as the interior of vertical arm support portion 190; mounting block 248 and bolt 250 fit easily slidably between webs 246, 246J of arm 182.

When arm 182 is pivoted downwardly about the pivotal connection provided by rivet 252, in the direction indicated by the double ended arrow in FIG. 24, the central portion of longitudinally elongated support web 244 contacts the head of bolt 250; support web 244 cannot move further arcuately downwardly as a result. Adjustment of the position of bolt 250, by rotating bolt 250 and advancing bolt 250 into or out of mounting block 248, adjusts the angle at which arm 182 (and specifically the central portion of longitudinally elongated support web 244) contacts bolt 250. This facilitates the adjustment of the angular position of arm 182 relative to the remainder of seat 14 when arm 182 is positioned at the limit of its arcuate downward travel.

Footrest 172 (FIG. 1) is adjustable to accommodate users of the curb-climbing power wheelchair of various heights. Additionally, the angle of footrest 172 is adjustable to provide maximum foot comfort for the user of the power wheelchair.

Footrest 172 is mounted for adjustable vertical movement along upstanding extension member 200 illustrated in FIG. 7. Member 200 preferably has vertically elongated slots formed in its forwardly and rearwardly facing surfaces; only the slot in the forward facing surface of member 200 is visible in FIG. 7.

Mounted in the opening at the top of upstanding extension member 200 is a knob and threaded shaft combination 253. The knob, which is designated 254 and is at the extreme upper portion of the attached threaded shaft, is visible in FIGS. 1 and 2. The threaded shaft portion (not shown) preferably runs down the length of the interior of upstanding extension member 200. The knob/threaded shaft combination 253 is retained in place by a square bushing which preferably fits flushly within the upper opening of upstanding extension member 200, which opening is visible in FIG. 7. The bushing is not shown in the drawings.

Footrest 172 is connected to upstanding extension member 200 by an open, box-like frame 256 shown in FIG. 7. Frame 256 fits slidably about upstanding extension member 200, in essentially complemental-facing contact with the four exterior surfaces of upstanding extension member 200. A transversely extending pivot pin 257, visible in FIG. 1, provides pivotal connection between footrest 172 and open box-like frame 256, permitting footrest 172 to tilt upwardly by pivotal motion about the pivot pin respecting open box-like frame 256 and upstanding extension member 200.

A nut (not shown), preferably a ball nut, threadedly engages the threaded shaft portion of the knob/threaded shaft combination 253 and is resident within vertically upstanding extension member 200. A pair of threaded shafts extend through apertures in the forwardly and rearwardly facing walls of open box-like frame 256 and through the vertically elongated slots in the forward and rearwardly facing surfaces of vertically upstanding member 200 and engage the nut within upstanding is member 200. This pair of threaded shafts restrain the nut from rotating with the threaded shaft of the knob/shaft combination 253 upon rotation of the knob 254.

With this arrangement, rotation of knob 254 produces corresponding rotation of the attached threaded shaft (not shown) since the knob 254 and threaded shaft are fixedly connected. Since the interior nut threadedly engages the threaded shaft, if the nut were not restrained against rotation, the nut would rotate with the shaft. However the threaded shafts restrain the interior nut against rotation and hence cause the interior nut to rise or fall according to the direction of rotation of the shaft and knob 254. This rise and fall of the interior nut carries the associated threaded shafts and hence open box-like frame 256 and footrest 172 therewith, as the knob 254 is rotated clockwise or counter-clockwise. Hence, vertical position of footrest 172 can be adjusted along the length of the vertically elongated slots present in vertically upstanding member 200 by manually turning knob 254; no tools are required for adjusting vertical position of footrest 172.

Angular orientation of footrest 172 relative to vertically upstanding member 200 may also be adjusted.

Footrest 172 includes an upstanding lip, visible in FIG. 1 and designated generally 264. An aperture 265 through the rear portion of lip 264, located at the transverse mid-point thereof, is tapped. A correspondingly threaded shaft (not shown) is provided for complemental threaded engagement with the tapped aperture 265 in lip 264. The threaded shaft, which has a knob attached thereto designated generally 266, abuttingly contacts the forward facing portion of a plate-like downward extension portion of open box-like frame 256. This forwardly facing downward plate-like extension covers the vertically elongated slot in the forwardly facing surface of vertically extending member 200 and provides a place for abutment of the threaded shaft. By rotating the knob 266 attached to the threaded shaft, thereby advancing or retracting the threaded shaft relative to lip 264, a greater or lesser portion of the shaft extends from the rear of lip 264 to contact the downward platelike extension of the forwardly facing portion of open box-like frame 256. This provides adjustment of angular position of footrest 172.

Preferably, cushion portion 20 of seat 14 is about 17 inches wide. Back portion 22 of seat 14 is preferably about 16 inches high in the seat style illustrated in FIGS. 2 through 6. In the style illustrated in FIG. 1 back portion 22 of seat 14 is about 18 inches high.

In the seat style illustrated in FIGS. 2 through 6, the longitudinal length of cushion portion 20 of seat 14 is preferably between 16 and 18 inches, most preferably 16 inches.

The use of seat height adjustment means provided by forward and rear upstanding seat support members 96, 98 permits adjustment of the height of seat 14 from about 16 and one-half inches to about 18 and one-half inches, measured from the bottom of seat 14 to the surface on which power wheelchair 10 rests.

Drive wheels 16 are preferably fourteen inch (14") or sixteen inch (16") diameter drive wheels. Rear idler wheels 18 are preferably eight inches (8") or ten inches (10") in diameter Forward anti-tip wheels 42, are preferably six inches (6") or eight inches (8") in diameter.

Power wheelchair 10 preferably has an overall length of thirty-nine and one-half inches (39½") and a width of twenty-five and four-tenths inch (25⁴⁄₁₀"). This results in the vehicle having a turning radius of nineteen and one-half inches (19½"), permitting power wheelchair 10 to be used easily in indoor environments, that have not been modified to accommodate handicapped personnel and conventional wheelchairs.

Power wheelchair control is effectuated utilizing a joystick controller designated generally 196 in the drawings. Suitable joystick controllers are available from Penny & Giles in Cristchurch, England, and are programmable and adjustable to provide variable sensitivity for the user.

The geometry provided by the arrangement of the frame 12, seat 14, drive motors 76, drive wheels 16, idler wheels 18 and anti-tilt wheels 42 provides outstanding handling and control as a result of weight distribution of the power wheel chair being very low.

A power wheel chair with body 34 in place on frame 12, has a center of gravity, when empty, about one and nine-tenths inches (1⁹⁄₁₀") above the axis of rotation 24 (FIG. 2) of drive wheels 16. Further, the center of gravity of the wheelchair 10 when empty is about 3.1 inches behind the axis of rotation 24 of drive wheels 16.

With the aforementioned dimensions, and when wheelchair 10 is empty, the center of gravity of wheelchair 10 is about 15.2% of the longitudinal distance between the axis 24 of drive wheels 16 and rear idler wheels 18.

What is claimed is:

1. A power wheelchair comprising:
   a. a frame,
   b. a seat removably connected to said frame;
   c. a pair of drive wheels connected to said frame and rotatable about transverse axes below a portion of said seat supporting an occupant's thighs;
   d. motors for driving respective drive wheels, respective motor/drive wheel combinations being pivotally connected to said frame;
   e. at least one ground-engaging idler wheel connected to said frame and located rearward of said drive wheels; and
   f. at least one anti-tip wheel forward of said drive wheels and positioned above ground, connected to one of said motors for pivotal movement therewith relative to said frame responsively to changes in drive wheel velocity.

2. The power wheelchair of claim 1 wherein said connection between said anti-tip wheel and said motor is rigid.

3. The wheelchair of claim 2 wherein said anti-tip wheel is spring-loaded.

4. A curb-climbing front wheel drive power wheelchair comprising:
   a. a frame;
   b. a pair of drive wheels;
   c. motors for driving respective drive wheels, respective motor/drive wheel combinations being pivotally connected to said frame;
   d. at least one ground-engaging idler wheel connected to said frame behind said drive wheels;
   e. at least one anti-tip wheel forward of said drive wheels and positioned above ground, rigidly connected to one of said motors for pivotal movement therewith respecting said frame.

5. The wheelchair of claim 4 wherein said anti-tip wheel is spring-loaded.

6. A power wheelchair comprising:
   a. a frame;
   b. a pair of drive wheels rotatable about transverse axes relative to said frame;
   c. motors for rotating respective drive wheels;
   d. a pair of anti-tip wheels adjustably positioned above ground and forward of said drive wheels; and
   e. means for pivotally unitarily connecting a drive wheel, an associated motor and an associated anti-tip wheel to said frame.

7. A power wheelchair comprising:
   a. a frame;
   b. a seat supported by said frame;
   c. a pair of drive wheels rotatable about transverse axes below said seat;
   d. motors for driving respective drive wheels pivotally connected to said frame;
   e. anti-tip wheels positioned above ground and forward of said drive wheels, pivotally connected to said frame;
   f. means for transmitting motion of said motor relative to said frame to said anti-tip wheels, for rotation relative to said frame in a common direction with said motor.

8. The wheelchair of claim 7 wherein said motion transmitting means is means for transmitting rotary motion and comprises a linkage.

9. The wheelchair of claim 7 wherein said anti-tip wheels are spring-loaded.

10. The wheelchair of claim 7 wherein said anti-tip wheels are fixedly connected to said motors.

11. The wheelchair of claim 7 wherein said anti-tip wheels and associated drive motors move together pivotally respecting said frame and independently of one another.

12. The power wheelchair of claim 1 wherein each drive wheel is independently suspended respecting said frame.

13. The power wheelchair of claim 1 further comprising a body an d wherein said frame supports said seat by extending through said body.

14. The power wheelchair of claim 1 wherein said seat is mounted on said frame proximate the frame longitudinal midpoint.

15. The power wheelchair of claim 1 wherein said transverse axes of said drive wheels are forward of the midpoint of the occupant supporting portion of said seat.

16. The power wheelchair of claim 15 further comprising seat height and tilt adjustment means comprising:
  a. front and rear seat support means longitudinally spaced from one another and connected to said frame; and
  b. means for fixing said front and rear seat support means independently among a plurality of vertical positions respecting said frame.

17. The power wheelchair of claim 16 wherein said seat support means further comprise means for detachably coupling with said seat.

18. The power wheelchair of claim 17 wherein said detachable coupling means further comprises:
  a. latch means for retaining said seat in fixed connection with at least one of said seat support members upon application of downward force to said seat, such as by a wheelchair user occupying said seat, and for releasing said seat from said coupled seat support member(s) responsively to application of manually generated and applied axially-oriented force to said latching means without use of tools.

19. The power wheelchair of claim 1 further comprising means for adjustably transversely separatingly positioning arms of said seat, said means comprising:
  a. an arm support base;
  b. arm support extensions connected to said arm support base and movable transversely therealong; and
  c. means for adjustably fixing said arm support extensions respecting said arm support base by application of manual force thereto without use of tools.

20. The power wheelchair of claim 19 wherein said means for adjustably transversely separatingly positioning said arms positions said arms along a continuum of positions.

21. The power wheelchair of claim 19 wherein said means for adjustably transversely separatingly positioning said arms is operable by application of manual rotary force thereto.

22. The power wheelchair of claim 1 further comprising a wheelchair body supported by said frame, said body comprising:
  a. a central portion;
  b. fender portions wrapping around said drive wheels;
  c. an openable bonnet portion for concealing the rear suspension of said wheelchair;
  d. rear corners of said body being rounded and running over idler wheel suspension gear;
  e. said rear corners and said fender portions transitioning to said central portion via at least partially concave transition portions running longitudinally along said central portion;
  f. a pair of forwardly facing integral bumper members lying over and protecting front anti-tilt wheel suspension members; and
  g. a planar portion extending between said forward bumper members providing a kick panel for the powered wheelchair occupant.

23. The power wheelchair of claim 22 wherein said body is a unitary piece of plastic.

24. The power wheelchair of claim 1 further comprising combination spring-strut beams for governing arcuate upward movement of said anti-tip wheels relative to said frame.

25. The power wheelchair of claim 1 further comprising means for adjusting the distance between said anti-tip wheels and the ground.

26. A power wheelchair comprising:
  a frame;
  a pair of ground-contacting drive wheels disposed on opposite sides of the frame;
  a suspension mounting each drive wheel on the frame for restricted movement relative thereto;
  at least one ground-contacting rear idler wheel disposed at the rear of the frame;
  a seat mounted on the frame and having a back;
  a pair of motors, each arranged to rotate an associated drive wheel;
  a pair of anti-tip idler wheels mounted to the front of the frame on either side, the anti-tip idler wheels positioned as to be above ground level when the wheelchair is standing on level ground on the drive wheels and rear idler wheels; and
  each said anti-tip idler wheel being linked to a respective drive wheel on the same side of the frame such that deceleration of forward movement of the drive wheel tends to cause a downward movement of the anti-tip idler wheel.

27. A wheelchair according to claim 26, wherein the drive wheel suspension further comprises:
  a pair of suspension arms, one on each side of the frame, each pivoted to the frame;
  a pair of springs, each acting in compression between the frame and a respective one of the suspension-arms, so as to urge the arm downwards relative to the frame; and
  each of the drive wheels and its associated motor being mounted on a respective one of the suspension arms.

28. A wheelchair according to claim 27, wherein the drive wheels are mounted with their axes of rotation fixed relative to the suspension arms, and the suspension arms extend rearwardly from their pivots to the drive wheels.

29. A wheelchair according to claim 26, comprising a pair of pivotally-mounted rocker arms, with a respective drive wheel and anti-tip wheel mounted on each rocker arm, the rocker arm being pivotally mounted at a point between the main wheel and the anti-tip wheel.

30. A wheelchair according to claim 26, wherein the suspensions of the drive wheels compose springs urging the drive wheels downwards relative to the frame.

31. A wheelchair according to claim 26, further comprising a pair of springs urging the anti-tip idler wheels downwards relative to the frame.

32. A wheelchair according to claim 26, wherein each said anti-tip idler wheel includes a resilient suspension.

* * * * *